United States Patent
Funabashi

(10) Patent No.: US 9,654,404 B2
(45) Date of Patent: May 16, 2017

(54) ON-BOARD WIRELESS DEVICE AND COMMUNICATION SYSTEM

(71) Applicant: DENSO CORPORATION, Kariya, Aichi-pref. (JP)

(72) Inventor: Junichiro Funabashi, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 99 days.

(21) Appl. No.: 14/598,248

(22) Filed: Jan. 16, 2015

(65) Prior Publication Data

US 2015/0207745 A1 Jul. 23, 2015

(30) Foreign Application Priority Data

Jan. 17, 2014 (JP) ................................. 2014-007164

(51) Int. Cl.
  *H04L 12/807* (2013.01)
  *H04W 72/02* (2009.01)
  *H04W 72/04* (2009.01)

(52) U.S. Cl.
  CPC ............. *H04L 47/27* (2013.01); *H04W 72/02* (2013.01); *H04W 72/048* (2013.01); *H04W 72/0446* (2013.01)

(58) Field of Classification Search
  CPC ........ H04L 47/27; H04L 67/12; H04W 72/02; H04W 72/048
  See application file for complete search history.

(56) References Cited

U.S. PATENT DOCUMENTS

2008/0037577 A1  2/2008 Nagura
2008/0186907 A1* 8/2008 Yagyuu ................. H04B 7/155
                                               370/328

(Continued)

FOREIGN PATENT DOCUMENTS

JP    2008-042738    2/2008
JP    2008-187463    8/2008

(Continued)

OTHER PUBLICATIONS

Office Action dated Jan. 19, 2016 in corresponding Japanese Application No. 2014-7164 with English translation.

*Primary Examiner* — Mohammad Anwar
(74) *Attorney, Agent, or Firm* — Harness, Dickey & Pierce, P.L.C.

(57) ABSTRACT

An on-board wireless device used in a subject vehicle and transmitting a vehicle information of the subject vehicle to a periphery vehicle positioned around the subject vehicle, includes a transmitting circuit successively transmitting the vehicle information of the subject vehicle via a vehicle-to-vehicle communication at a transmission interval, a transmission interval setting section setting the transmission interval that is variable for transmitting the vehicle information, and a generation section generating the vehicle information to be transmitted by the transmitting circuit. The generation section includes, in the vehicle information, a transmission interval related information based on which the transmission interval set by the transmission interval setting section is specified. The transmitting circuit transmits the vehicle information that includes the transmission interval related information to the periphery vehicle.

13 Claims, 15 Drawing Sheets

(56) References Cited

U.S. PATENT DOCUMENTS

| | | | |
|---|---|---|---|
| 2010/0267379 A1 | 10/2010 | Stählin et al. | |
| 2011/0019577 A1 | 1/2011 | Nagura | |
| 2011/0034201 A1* | 2/2011 | Hamada | H04L 67/12 455/517 |

FOREIGN PATENT DOCUMENTS

| | | |
|---|---|---|
| JP | 2010-219919 | 9/2010 |
| JP | 2011-520160 | 7/2011 |
| JP | 2011-259027 | 12/2011 |

* cited by examiner

FIG. 5

| VEHICLE SPEED (km/h) | TRANSMISSION INTERVAL (ms) |
|---|---|
| =0 | 1,000 |
| <20 | 500 |
| <40 | 200 |
| ≥40 | 100 |

FIG. 6

| DISTANCE TO CLOSEST PERIPHERY VEHICLE (m) | TRANSMISSION INTERVAL (ms) |
|---|---|
| <600 | 500 |
| <400 | 200 |
| <200 | 100 |

FIG. 7

| CONGESTION DEGREE (%) | TRANSMISSION INTERVAL (ms) |
|---|---|
| <60 | 100 |
| <80 | 200 |
| ≥80 | 300 |

| ID | VEHICLE POSITION | TRAVELLING DIRECTION | VEHICLE SPEED | TRANSMISSION INTERVAL | ESTIMATED NEXT RECEIVE TIME |
|---|---|---|---|---|---|
| 1 | (X1, Y1) | θ1 | V1 | 100ms | XXX |
| 2 | (X2, Y2) | θ2 | V2 | 500ms | YYY |
| 3 | (X3, Y3) | θ3 | V3 | 200ms | ZZZ |

ON-BOARD WIRELESS DEVICE AND COMMUNICATION SYSTEM

CROSS REFERENCE TO RELATED APPLICATION

This application is based on Japanese Patent Application No. 2014-007164 filed on Jan. 17, 2014, the disclosure of which is incorporated herein by reference.

TECHNICAL FIELD

The present disclosure relates to an on-board wireless device and a communication system including the on-board wireless device.

BACKGROUND

In a vehicle-to-vehicle communication, a technology has been used for changing a transmission interval of vehicle information from one vehicle to another vehicle so that each vehicle has enough chance to perform the vehicle-to-vehicle communication. For example, JP 2010-219919 A discloses an on-board communication device that extends a transmission interval of vehicle information in a stationary state of the vehicle so that the transmission interval in the stationary state is longer than a transmission interval in a travelling state of the vehicle. This is because, when the subject vehicle is in the stationary state, the subject vehicle is less likely to affect vehicles existing around the subject vehicle.

The transmission interval may be extended when a communication interruption occurs in a communication pathway caused by an obstruction existing in the communication pathway. An extension of the transmission interval may also be caused by a fading of a communication signal, or by a substantially long distance between two communication partners. Thus, in the vehicle-to-vehicle communication, when the transmission interval of vehicle information is extended at a first vehicle that transmits the vehicle information, a second vehicle that receives the vehicle information via the vehicle-to-vehicle communication from the first vehicle is difficult to distinguish an intentional extension of the transmission interval at the first vehicle from an extension of the transmission interval caused by an external factor. Thus, with the technology disclosed in JP 2010-219919 A, the second vehicle that receives the vehicle information from the first vehicle has a difficulty in determining an occurrence of the communication interruption in the vehicle-to-vehicle communication.

When a determination of the communication interruption occurrence becomes difficult at the second vehicle, the second vehicle may fail to provide a proper drive assist. Herein, the drive assist is performed based on the vehicle information transmitted from vehicles existing around the second vehicle. For example, the drive assist may include a determination and a notification of a vehicle that approaches to the second vehicle. When the determination of the communication interruption occurrence becomes difficult at the second vehicle, the second vehicle may fail to determine whether a vehicle exists around itself. When the second vehicle fails to specify a vehicle existing around itself, a proper drive assist cannot be provided to a driver or a user of the second vehicle.

SUMMARY

In view of the foregoing difficulties, it is an object of the present disclosure to provide an on-board wireless device and a communication system, each of which improves a performance for determining a communication interruption at a receiving end in a vehicle-to-vehicle communication when a transmission interval of vehicle information is variable.

According to a first aspect of the present disclosure, an on-board wireless device used in a subject vehicle and transmitting vehicle information of the subject vehicle to a periphery vehicle positioned around the subject vehicle, includes a transmitting circuit, a transmission interval setting section, and a generation section. The transmitting circuit successively transmits the vehicle information of the subject vehicle via a vehicle-to-vehicle communication at a transmission interval. The transmission interval setting section sets the transmission interval that is variable for transmitting the vehicle information. The generation section generates the vehicle information to be transmitted by the transmitting circuit. The generation section includes transmission interval related information in the vehicle information. The transmission interval related information is information based on which the transmission interval set by the transmission interval setting section is specified. The transmitting circuit transmits the vehicle information that includes the transmission interval related information to the periphery vehicle.

In the above device, the vehicle information includes the transmission interval related information based on which the transmission interval of the vehicle information is specified. Thus, even when the transmission interval for transmitting the vehicle information is changed, a determination of the communication interruption at a receiving side of the vehicle information can be facilitated.

According to a second aspect of the present disclosure, an on-board wireless device used in a subject vehicle and receiving, from a periphery vehicle positioned around the subject vehicle, vehicle information of the periphery vehicle, includes a receiving circuit and a communication interruption determination section. The receiving circuit successively receives the vehicle information of the periphery vehicle from the periphery vehicle via a vehicle-to-vehicle communication. The vehicle information of the periphery vehicle includes transmission interval related information based on which a transmission interval for transmitting the vehicle information at the periphery vehicle is specified. The communication interruption determination section determines an occurrence of a communication interruption in the vehicle-to-vehicle communication between the subject vehicle and the periphery vehicle based on the transmission interval specified from the transmission interval related information.

In the above device, the vehicle information includes the transmission interval related information based on which the transmission interval of the vehicle information is specified. Thus, even when the transmission interval for transmitting the vehicle information is changed, a determination of the communication interruption at a receiving side of the vehicle information can be facilitated.

According to a third aspect of the present disclosure, a communication system includes a first on-board wireless device and a second on-board wireless device. The first on-board wireless device is used in a first vehicle. The first on-board wireless device successively transmits vehicle information of the first vehicle to a second vehicle positioned around the first vehicle via a vehicle-to-vehicle communication. The first on-board wireless device includes a transmitting circuit that successively transmits the vehicle information of the first vehicle at a transmission interval that is variable. The second on-board wireless device used in the second vehicle, and the second on-board wireless device successively receives the vehicle information of the first vehicle from the first vehicle. The first on-board wireless device further includes a transmission interval setting section and a generation section. The transmission interval setting section sets the transmission interval that is variable for transmitting the vehicle information of the first vehicle. The generation section generates the vehicle information of the first vehicle to be transmitted by the transmitting circuit. The generation section includes transmission interval related information in the vehicle information of the first vehicle. The transmission interval related information is an information based on which the transmission interval set by the transmission interval setting section is specified. The transmitting circuit transmits the vehicle information of the first vehicle which includes the transmission interval related information. The second on-board wireless device includes a receiving circuit and a communication interruption determination section. The receiving circuit successively receives the vehicle information of the first vehicle from the first vehicle via the vehicle-to-vehicle communication. The vehicle information of the first vehicle includes the transmission interval related information. The communication interruption determination section determines an occurrence of a communication interruption in the vehicle-to-vehicle communication between the first on-board wireless device and the second on-board wireless device based on the transmission interval specified from the transmission interval related information included in the vehicle information of the first vehicle.

In the above communication system, the vehicle information includes the transmission interval related information based on which the transmission interval of the vehicle information is specified. Thus, even when the transmission interval for transmitting the vehicle information is changed, a determination of the communication interruption at a receiving side of the vehicle information can be facilitated.

BRIEF DESCRIPTION OF THE DRAWINGS

The above and other objects, features and advantages of the present disclosure will become more apparent from the following detailed description made with reference to the accompanying drawings. In the drawings:

FIG. 5 is a diagram showing an example of a relation table between a vehicle speed and a transmission interval;

FIG. 6 is a diagram showing an example of a relation table between a distance and a transmission interval;

FIG. 7 is a diagram showing an example of a relation table between a congestion degree and a transmission interval;

DETAILED DESCRIPTION

The following will describe embodiments of the present disclosure with reference to accompanying drawings.

First Embodiment

Figure 1:
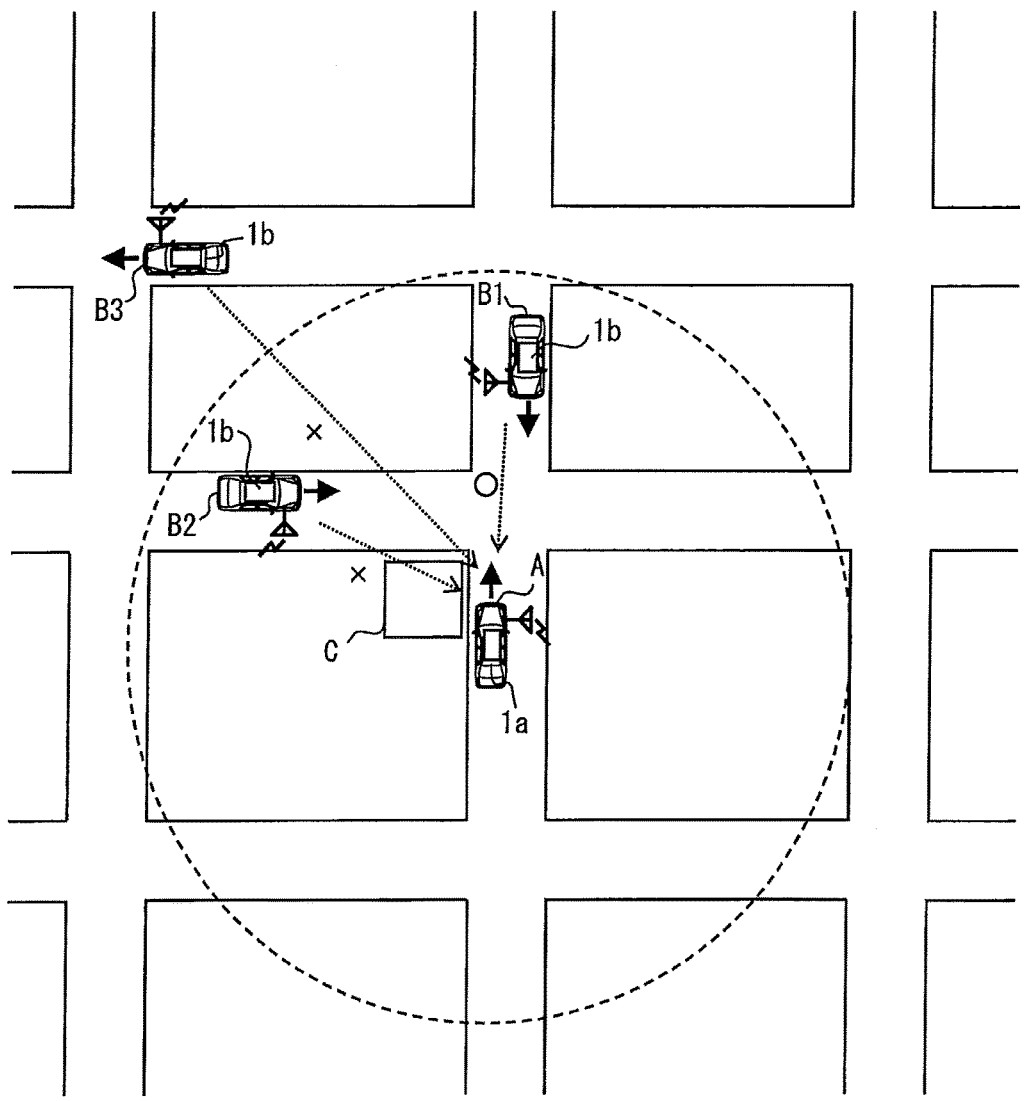
FIG. 1 is a diagram showing a configuration of a communication system according to an embodiment of the present disclosure.

The following will describe a configuration of a communication system 100 according to the present disclosure. FIG. 1 is a diagram showing an example of a configuration of a communication system 100, which the present disclosure is applied to. As shown in FIG. 1, the communication system 100 includes multiple on-board devices 1 that are equipped to respective vehicles including a vehicle A, a vehicle B1, a vehicle B2, and a vehicle B3. The on-board device 1 is able to perform a wireless communication, and the on-board device 1 equipped to each of the multiple vehicles is able to communicate with another on-board device 1 that is equipped to a different vehicle.

In the following description, suppose that the on-board devices 1 equipped to the vehicles B1, B2, B3 transmit informations related to the respective vehicles, and the on-board device 1 equipped to the vehicle A receives the informations transmitted from respective on-board devices 1 of the vehicles B1 to B3. For description convenience, hereinafter, the on-board devices 1, which are equipped to respective vehicles B1 to B3 and transmit the informations, are referred to as first on-board devices 1b, and the on-board device 1, which is equipped to the vehicle A and receives the informations, is referred to as a second on-board device 1a. When it is not necessary to differentiate the first on-board device 1b that transmit information from the second on-board device 1a that receives information, a term of on-board device 1 is generally used in the following description. In the present disclosure, the on-board device 1 functions as an on-board wireless device. Herein, wireless device means wireless communication device that is able to perform a wireless communication. The vehicles B1 to B3 including respective first on-board devices 1b are also referred to as first vehicles, and the vehicle A including the second on-board device 1a is also referred to as a second vehicle.

FIG. 1 shows an example of a vehicle-to-vehicle communication among multiple vehicles. In FIG. 1, an arrow illustrated in relation to each vehicle A, B1, B2, B3 indicates a travelling direction of corresponding vehicle, and a circle illustrated by a dashed line indicates a communication range of the second on-board device 1a of the second vehicle A. The first vehicle B1 is positioned within the communication range of the second on-board device 1a of the second vehicle A. The second on-board device 1a of the second vehicle A receives information transmitted from the first on-board device 1b of the first vehicle B1. The first vehicle B2 is also positioned within the communication range of the second on-board device 1a of the second vehicle A. Suppose that an obstruction C interrupts a wireless communication between the first on-board device 1b of the first vehicle B2 and the second on-board device 1a of the second vehicle A. The first vehicle B3 is positioned out of the communication range of the second on-board device 1a of the second vehicle A. Thus, second on-board device 1a of the second vehicle A cannot receive information transmitted from the first on-board device 1b of the first vehicle B3.

Figure 2:
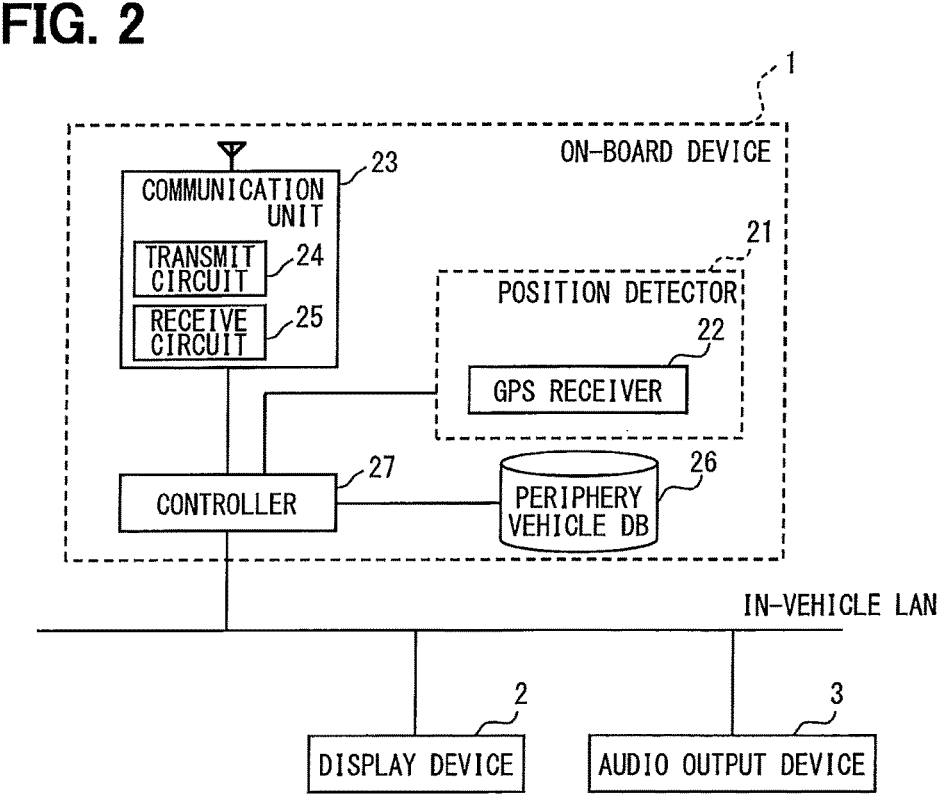
FIG. 2 is a block diagram showing an example of a configuration of an on-board device.

The following will describe a configuration of the on-board device 1 equipped to the vehicle A, B1 to B3 with reference to FIG. 2. In the following description, suppose that the vehicle A is a subject vehicle and the vehicles B1, B2, B3 are periphery vehicles. The on-board device 1 of the subject vehicle A communicates with the on-board device of the periphery vehicle B1, B2, B3 that is positioned around the subject vehicle A. The on-board device 1 may be provided by a device that is fixed to the vehicle or may be provided by a device that is carried into a compartment of the vehicle by a user.

As an example, as shown in FIG. 2, the on-board device 1 is connected with a display device 2 and an audio output device 3 via an in-vehicle local area network (LAN). As shown in FIG. 2, the on-board device 1 includes a position detector 21, a communication unit 23, a periphery vehicle database (DB) 26, and a controller 27.

The position detector 21 includes a global positioning system (GPS) receiver 22. With the global positioning system, a current position of a vehicle can be specified based on radio waves transmitted from satellites. Hereinafter, the current position of the vehicle is also referred to as a vehicle position. The position detector 21 successively detects the vehicle position based on information acquired by the GPS receiver 22. The vehicle position may be indicated by at least one of a longitude coordinate or a latitude coordinate.

In the present embodiment, as a satellite positioning system receiver, the GPS receiver 22 is used as an example. As another example, the vehicle position may be specified by a receiver other than the GPS receiver 22.

The communication unit 23 has an antenna, and communicates with the on-board device 1 of the periphery vehicle in a manner other than a public communication network. For example, the communication unit 23 of the on-board device 1 of the subject vehicle may transmit or receive information to or from the on-board device 1 of the periphery vehicle in a broadcasting manner. The broadcasting manner is one kind of a wireless communication. That is, the communication unit 23 performs the vehicle-to-vehicle communication. In the present disclosure, the vehicle-to-vehicle communication may be performed using radio waves of 700 megahertz band. The communication unit 23 includes a transmitting circuit 24 and a receiving circuit 25. The transmitting circuit 24 transmits the vehicle information via the vehicle-to-vehicle communication. The receiving circuit 25 receives vehicle information transmitted from the periphery vehicle via the vehicle-to-vehicle communication. The vehicle information includes vehicle position information, transmission interval related information and the like. Herein, the transmission interval related information is information related to a transmission interval of the vehicle information transmission. The transmission interval related information is also referred to as information based on which the transmission interval is specified.

The periphery vehicle database 26 registers the vehicle information received by the receiving circuit 25 in correspondence with the periphery vehicle that has transmitted the vehicle information. Herein, the periphery vehicle that has transmitted the vehicle information is also referred to as a transmission source. The periphery vehicle database 26 functions as a registering section.

Figure 3:
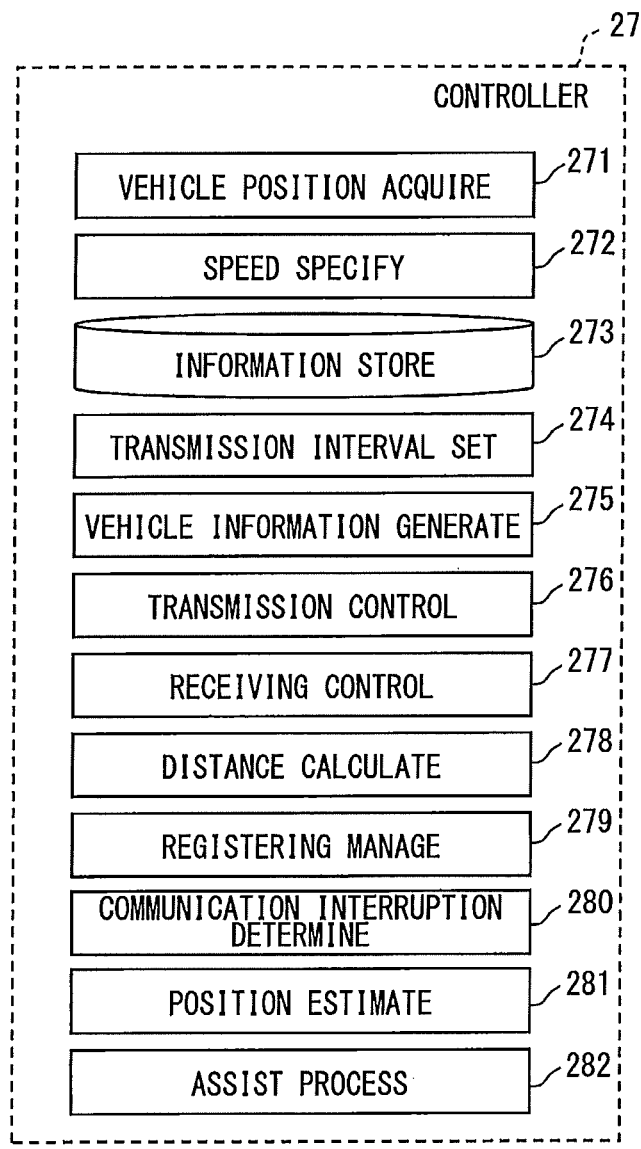
FIG. 3 is a block diagram showing an example of a configuration of a controller according to a first embodiment of the present disclosure.

The controller 27 is provided by a well-known general purpose computer. The controller 27 includes a central processing unit (CPU), a read-only memory (ROM), a random access memory (RAM), an electrically erasable programmable read-only memory (EEPROM), an input/output (I/O), and a bus line connects these components. A specific configuration of the controller 27 is not shown in the drawing. The CPU of the controller 27 executes programs preliminarily stored in the ROM so that the controller 27 can provide various functions. Herein, the CPU executes various programs based on information acquired from the position detector 21, the receiving circuit 25, and the periphery vehicle database 26, As shown in FIG. 3, the controller 27 includes a vehicle position acquirement section (VEHICLE POSITION ACQUIRE) 271, a speed specifying section (SPEED SPECIFY) 272, an information storing section (INFORMATION STORE) 273, a transmission interval setting section (TRANSMISSION INTERVAL SET) 274, a vehicle information generation section (VEHICLE INFORMATION GENERATE) 275, a transmission control section (TRANSMISSION CONTROL) 276, a receiving control section (RECEIVING CONTROL) 277, a distance calculation section (DISTANCE CALCULATE) 278, a registering management section (REGISTERING MANAGE) 279, a communication interruption determination section (COMMUNICATION INTERRUPTION DETERMINE) 280, a position estimation section (POSITION ESTIMATE) 281, and an assist processing section (ASSIST PROCESS) 282.

Figure 4:
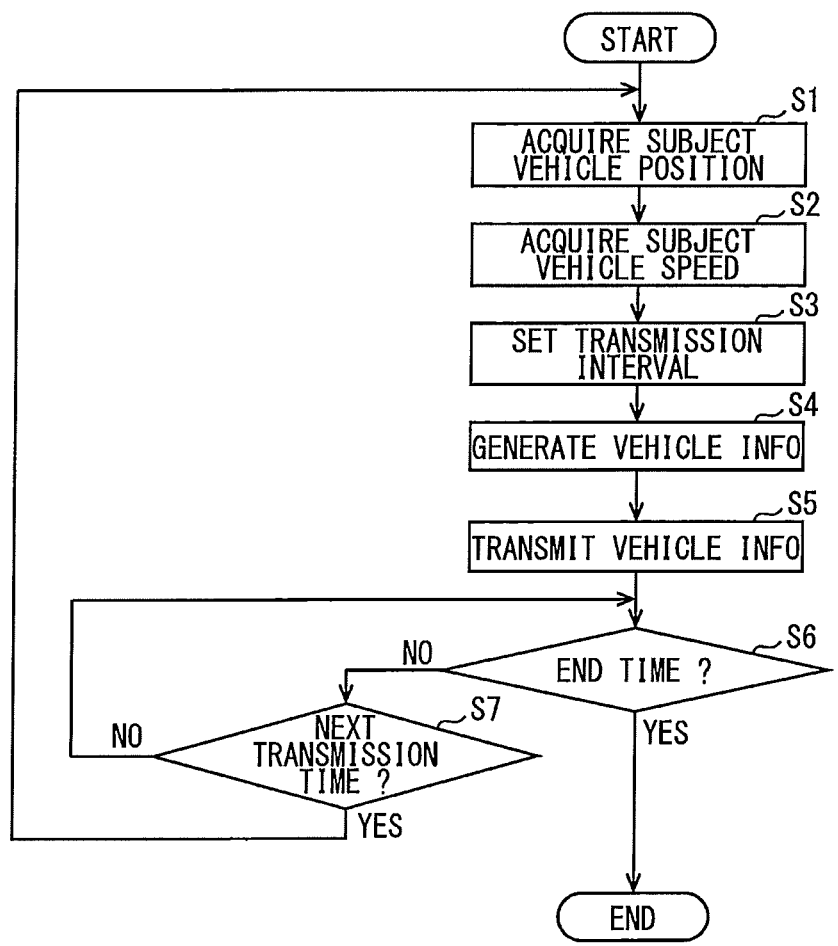
FIG. 4 is a flowchart showing an example of a transmission related process executed by the controller of the on-board device.

The following will describe a process related to a transmission of information with reference to FIG. 4. The process related to the transmission of information is also referred to as a transmission related process. The transmission related process is executed by the controller 27 of the first on-board device 1b of the first vehicle B1, B2, B3. As described above, the first on-board device 1b of the first vehicle B1, B2, B3 transmits the vehicle information. In the transmission related process, the vehicle information including the vehicle position information and the transmission interval related information is generated, and is transmitted to the vehicles existing around. The process shown in flowchart of FIG. 4 may start when the receiving circuit 25 of the first on-board device 1b receives the vehicle information.

First at S1, the vehicle position acquirement section 271 acquires latest information of a current position of the subject vehicle, which is detected by the position detector 21. The information storing section 273 stores the vehicle position acquired by the vehicle position acquirement section 271. The information storing section 273 may be provided by an electrically rewritable memory, such as RAM or EEPROM.

The information storing section 273 stores the vehicle position correlated with a time at which the vehicle position is detected. That is, the information storing section 273 stores the vehicle position with time stamp. When the information storing section 273 does not have enough capacity to store newly acquired vehicle position, the information storing section 273 deletes information in a time sequence order, that is, from old to new. As another example, when the information storing section 273 does not have enough capacity to store newly acquired vehicle position, the information storing section 273 may delete the information that has been stored for a predetermined time period or longer.

At S2, the speed specifying section 272 specifies a speed of the subject vehicle. The speed of the subject vehicle may be specified based on a signal output from a wheel speed sensor of the subject vehicle. As another example, the speed specifying section 272 may specify the speed of the subject vehicle based on the vehicle positions stored in the information storing section 273. When the speed specifying section 272 specifies the speed of the subject vehicle based on the vehicle positions stored in the information storing section 273, the speed specifying section 272 may, based on the multiple vehicle positions, calculate a travelling distance of the subject vehicle for a unit time period as the speed of the subject vehicle. The speed specifying section 272 functions as a vehicle speed specifying section.

At S3, the transmission interval setting section 274 determines (sets) a time interval from one transmission of the vehicle information to a next transmission of the vehicle information. For example, the transmission interval may be determined based on a table that defines a relation between the vehicle speed and the transmission interval. The table defining the relation between the vehicle speed and the transmission interval may also be referred to as a speed-transmission interval table. Specifically, the transmission interval setting section 274 may determine the transmission interval that corresponds to the vehicle speed acquired at S2 based on the speed-transmission interval table.

FIG. 5 shows an example of the speed-transmission interval table. As shown in FIG. 5, the speed-transmission interval table defines the following relations. When the vehicle speed is equal to 0 kilometer per hour (km/h), the transmission interval is set to 1000 milliseconds (ms). When the vehicle speed is higher than 0 km/h and lower than 20 km/h, the transmission interval is set to 500 ms. When the vehicle speed is equal to or higher than 20 km/h and lower than 40 km/h, the transmission interval is set to 200 ms. When the vehicle speed is equal to or higher than 40 km/h, the transmission interval is set to 100 ms.

As described above, the transmission interval setting section 274 may set the transmission interval so that the transmission interval decreases with an increase of the vehicle speed. Usually, the vehicle positions change more frequently with an increase of the vehicle speed. Thus, when the vehicle speed increases, the vehicle information of the subject vehicle needs to be more frequently transmitted to the periphery vehicle for notifying the latest position of the subject vehicle to the periphery vehicle in a timely manner. With above-described configuration, the transmission interval may be set with consideration of actual needs for specifying the vehicle position.

At S4, the vehicle information generation section 275 reads out the vehicle position together with the time stamp from the information storing section 273. Then, the vehicle information generation section 275 generates the vehicle information so that the vehicle information includes the vehicle position together with the time stamp and the transmission interval determined at S3. Herein, the vehicle information generation section 275 generates the vehicle information to have a standard format. The vehicle information generation section 275 functions as a generation section.

When generating the vehicle information, multiple vehicle positions read out in a time sequence may be inserted to the vehicle information. The vehicle information generation section 275 may generate the vehicle information so that the vehicle information includes a travelling direction of the subject vehicle and the speed of the subject vehicle. In the following description of the present embodiment, the vehicle information including the travelling direction of the subject vehicle and the vehicle speed will be described as an example.

The vehicle speed specified by the speed specifying section 272 may be used for generating the vehicle information. The travelling direction of the subject vehicle may be specified based on multiple time-sequence vehicle positions using a least-squares method. Specifically, an extension direction of a line approximated based on the multiple time-sequence vehicle positions using the least-squares method may be set as the travelling direction of the subject vehicle. Then, the specified travelling direction may be included in the vehicle information. In the present embodiment, the travelling direction of the subject vehicle is specified based on multiple vehicle positions of the subject vehicle. For another example, when the vehicle has a geomagnetic sensor, the travelling direction may be specified based on a signal or information output from the geomagnetic sensor.

At S5, the transmission control section 276 transmits the vehicle information generated by the vehicle information generation section 275 through the transmitting circuit 24. At S6, the controller 27 determines whether to end the transmission related process. Specifically, the controller 27 determines whether the current time is an end timing of the transmission related process. When determining that the current time is the end timing of the transmission related process (S6: YES), the controller 27 ends the transmission related process. When the controller 27 determines that the current time is not the end timing of the transmission related process (S6: NO), the controller 27 proceeds to S7. As an example, a time at which the first on-board device 1b is powered off may be set as the end timing of the transmission related process, and the controller 27 may determine whether the first on-board device 1b is powered off at S6.

At S7, when the controller 27 determines that the current time is the next transmission time point of the vehicle information (S7: YES), the controller 27 returns to S1, and repeatedly process the above-described process. Herein, the next transmission time point of the vehicle information is defined based on the transmission interval set by the transmission interval setting section 274. When the controller 27 determines that the current time is not the next transmission time point of the vehicle information (S7: NO), the controller 27 returns to S6 and repeatedly performs the determinations at S6 and S7.

First Modification

The following will describe a first modification of the present embodiment. As shown in the flowchart of FIG. 4, the transmission interval setting section 274 of the controller 27 of the first on-board device 1b sets the transmission interval corresponding to the speed of the subject vehicle. As another example, the transmission interval setting section 274 may set the transmission interval corresponding to a distance between the subject vehicle and the periphery vehicle. The following will describe a specific configuration of the first modification. In the following description, configurations or functions similar to the above-described embodiment are omitted for simplification, and the same reference symbol is used for the same or equivalent part.

Figure 8:
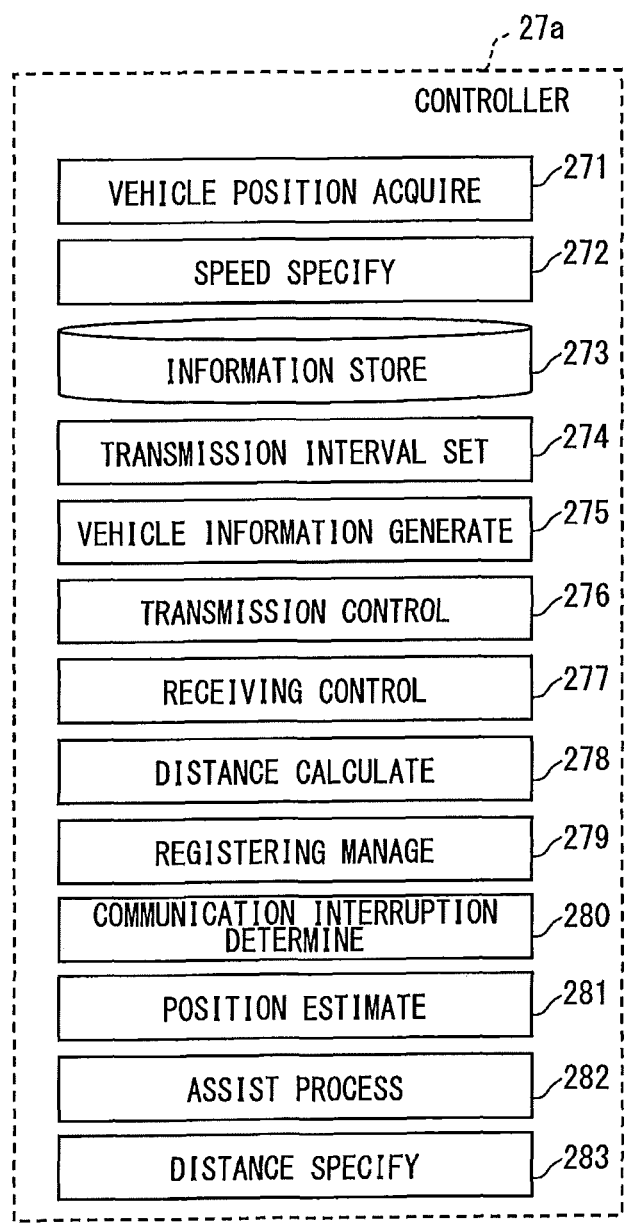
FIG. 8 is a block diagram showing an example of a configuration of a controller according to a first modification of the present disclosure.

The first on-board device 1b according to the first modification includes a controller 27a shown in FIG. 8. A configuration of the controller 27a according to the first modification is different from the configuration of the controller 27 according to the above-described first embodiment. Specifically, the controller 27a according to the first modification includes a distance specifying section (DISTANCE SPECIFY) 283. The distance specifying section 283 successively specifies a distance between the subject vehicle and the closest periphery vehicle.

As shown in FIG. 8, the controller 27a includes the vehicle position acquirement section 271, the speed specifying section 272, the information storing section 273, the transmission interval setting section 274, the vehicle information generation section 275, the transmission control section 276, the receiving control section 277, the distance calculation section 278, the registering management section 279, the communication interruption determination section 280, the position estimation section 281, the assist processing section 282, and the distance specifying section 283.

For example, the distance specifying section 283 of the on-board device 1 of the subject vehicle calculates the distances between the subject vehicle and respective periphery vehicles based on the vehicle positions of the periphery vehicles included in the vehicle informations transmitted from respective periphery vehicles and the vehicle position of the subject vehicle which is acquired by the vehicle position acquirement section 271. Herein, the distance between the subject vehicle and the periphery vehicle is a distance along a straight line. Then, the distance specifying section 283 specifies one of the periphery vehicles which has the shortest distance from the subject vehicle as the closest periphery vehicle, and specifies the distance between the subject vehicle and the closest periphery vehicle. When the distance specifying section 283 calculates the distance between the subject vehicle and each periphery vehicle, the vehicle position of the subject vehicle corresponding to one time stamp and the vehicle position of the periphery vehicle corresponding to the same or similar time stamp may be used to calculate the distance between the subject vehicle and the periphery vehicle.

When the subject vehicle has a radar or a camera that is able to detect the distance between the subject vehicle and the periphery vehicle, the distance specifying section 283 may specify the distances between the subject vehicle and the periphery vehicles based on the distances detected by the radar or the camera, and further specifies the closest periphery vehicle.

In the first modification, for example, the transmission interval may be determined based on a table that defines a relation between the distance and the transmission interval. The table defining the relation between the distance and the transmission interval may also be referred to as a distance-transmission interval table. Specifically, the transmission interval setting section 274 according to the first modification may determine the transmission interval that corresponds to the distance between the subject vehicle and the closest periphery vehicle based on the distance-transmission interval table. Herein, the distance between the subject vehicle and the closest periphery vehicle is specified by the distance specifying section 283.

FIG. 6 shows an example of the distance-transmission interval table. As shown in FIG. 6, the distance-transmission interval table defines the following relations. When the distance between the subject vehicle and the closest periphery vehicle is shorter than 600 meters (m) and equal to or longer than 400 m, the transmission interval is set to 500 ms. When the distance between the subject vehicle and the closest periphery vehicle is shorter than 400 m and equal to or longer than 200 m, the transmission interval is set to 200 ms. When the distance between the subject vehicle and the closest periphery vehicle is shorter than 200 m, the transmission interval is set to 100 ms.

As described above, the transmission interval setting section 274 according to the first modification may set the transmission interval so that the transmission interval decreases with a decrease of the distance between the subject vehicle and the closest periphery vehicle. Usually, when the distance between the subject vehicle and the closest periphery vehicle decreases, the vehicle information of the subject vehicle needs to be more frequently transmitted to the closest periphery vehicle for notifying the latest position of the subject vehicle to the closest periphery vehicle in a timely manner. With above-described configuration, the transmission interval may be set with consideration of actual needs for specifying the vehicle position.

Second Modification

The following will describe a second modification of the present embodiment. In the first modification, the distance between the subject vehicle and the closest periphery vehicle is used for determining the transmission interval. As another example, the transmission interval setting section 274 may determine the transmission interval corresponding to a congestion degree of the vehicle-to-vehicle communication between the subject vehicle and the periphery vehicles. The following will describe a specific configuration of the second modification. In the following description, configurations or functions similar to the above-described embodiment or modification are omitted for simplification, and the same reference symbol is used for the same or equivalent part.

Figure 9:
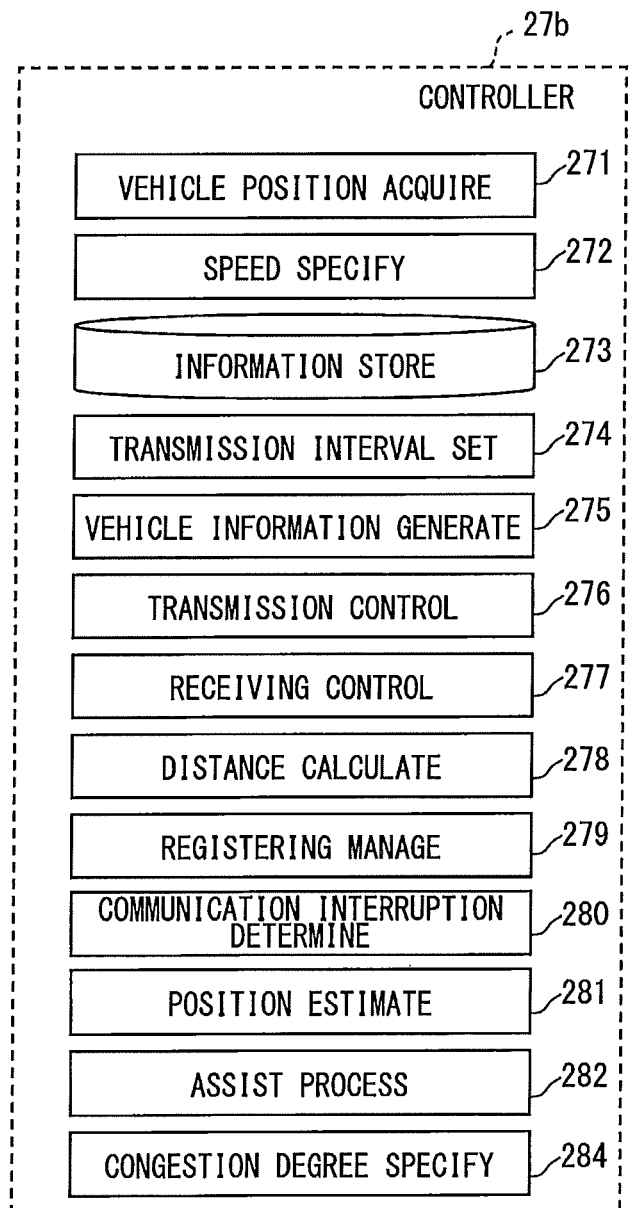
FIG. 9 is a block diagram showing an example of a configuration of a controller according to a second modification of the present disclosure.

The first on-board device 1b according to the second modification includes a controller 27b shown in FIG. 9. A configuration of the controller 27b according to the second modification is different from the configuration of the controller 27 according to the above-described first embodiment. Specifically, the controller 27b according to the second modification includes a congestion degree specifying section (CONGESTION DEGREE SPECIFY) 284. The congestion degree specifying section 284 successively specifies a congestion degree of the vehicle-to-vehicle communication between the subject vehicle and the periphery vehicles.

As shown in FIG. 9, the controller 27b includes the vehicle position acquirement section 271, the speed specifying section 272, the information storing section 273, the transmission interval setting section 274, the vehicle information generation section 275, the transmission control section 276, the receiving control section 277, the distance calculation section 278, the registering management section 279, the communication interruption determination section 280, the position estimation section 281, the assist processing section 282, and the congestion degree specifying section 284.

For example, congestion degree specifying section 284 of the subject vehicle may specify a receiving frequency at the receiving circuit 25 of the first on-board device 1b as the congestion degree of the vehicle-to-vehicle communication between the subject vehicle and the periphery vehicles. Herein, the receiving frequency at the receiving circuit 25 may be a duty ratio, which is a ratio of receiving time period of information to a unit time period. As another example, the number of the periphery vehicles that perform the vehicle-to-vehicle communication with the subject vehicle may also be used as the congestion degree.

In the second modification, for example, the transmission interval may be determined based on a table defining a relation between the congestion degree and the transmission interval. The table defining the relation between the congestion degree and the transmission interval may also be referred to as a congestion degree-transmission interval table. Specifically, the transmission interval setting section 274 according to the second modification may determine the transmission interval that corresponds to the congestion degree specified by the congestion degree specifying section 284 based on the congestion degree-transmission interval table.

FIG. 7 shows an example of the congestion degree-transmission interval table. As shown in FIG. 7, the congestion degree-transmission interval table defines the following relations. When the congestion degree is lower than 60%, the transmission interval is set to 100 ms. When the congestion degree is equal to or higher than 50% and lower than 80%, the transmission interval is set to 200 ms. When the congestion degree is equal to or higher than 80%, the transmission interval is set to 300 ms.

As described above, the transmission interval setting section 274 according to the second modification sets the transmission interval so that the transmission interval increases with an increase of the congestion degree. Usually, when the congestion degree of the vehicle-to-vehicle communication between the subject vehicle and the periphery vehicles increases, the vehicle information of the subject vehicle needs to be less frequently transmitted to the periphery vehicles for securing a sufficient vehicle-to-vehicle communication at the periphery vehicle. With above-described configuration, the transmission interval may be set with consideration of actual needs for specifying the vehicle position.

The following will describe a third modification of the present embodiment. In the third modification, the transmission interval setting section 274 determines the transmission interval based on at least two factors of the speed of the subject vehicle, the distance between the subject vehicle and the closest periphery vehicle, or the congestion degree of the vehicle-to-vehicle communication.

When the transmission interval setting section 274 determines the transmission interval based on two or more factors, the transmission interval setting section 274 may refer to a table or an information map that defines a relation between the transmission interval and a combination of the two or more factors.

The following will describe a process related to a receiving of information according to the present embodiment. The process related to the receiving of information is also referred to as a receiving related process. Specifically, the receiving related process executed by the controller 27 of the second on-board device 1a of the second vehicle A will be described with reference to FIG. 10. As described above, the second on-board device 1a of the second vehicle A receives the vehicle information transmitted from the first vehicle B1, B2, B3. In the receiving related process, the controller 27 of the second on-board device 1a selects a target vehicle information from the multiple received vehicle informations. Herein, the target vehicle information is a vehicle information to be registered in the periphery vehicle database 26. Then, the controller 27 registers the target vehicle information in the periphery vehicle database 26. The process shown in the flowchart of FIG. 10 may start when the second on-board device 1a is powered on.

At S21, the receiving control section 277 performs a receiving process. In the receiving process, the receiving control section 277 converts the vehicle information received by the receiving circuit 25 to digital information (data) that is usable by the controller 27.

At S22, the distance calculation section 278 calculates a distance between the subject vehicle and the periphery vehicle, which is the transmission source of the vehicle information received by the receiving circuit 25. Hereinafter, the periphery vehicle that is the transmission source of the vehicle information is also referred to as transmission source vehicle. For example, the distance calculation section 278 calculates the distance along a straight line between the subject vehicle and the transmission source vehicle based on the vehicle position of the transmission source vehicle and the vehicle position of the subject vehicle. Herein, the distance calculation section 278 acquires the vehicle position of the transmission source vehicle from the vehicle information of the transmission source vehicle received by the receiving circuit 25, and the vehicle position of the subject vehicle is acquired by the vehicle position acquirement section 271. The vehicle position of the subject vehicle corresponding to one time stamp and the vehicle position of the transmission source vehicle corresponding to the same or similar time stamp may be used to calculate the distance between the subject vehicle and the transmission source vehicle.

At S23, the controller 27 determines whether the distance between the subject vehicle and the transmission source vehicle calculated by the distance calculation section 278 is equal to or shorter than a predetermined distance (Dth). When the distance between the subject vehicle and the transmission source vehicle is equal to or shorter than the predetermined distance (S23: YES), the process proceeds to S24. When the distance between the subject vehicle and the transmission source vehicle is longer than the predetermined distance (S23: NO), the process proceeds to S25. Herein, the predetermined distance is a settable parameter, and may be set according to actual needs.

Figures 10, 11:
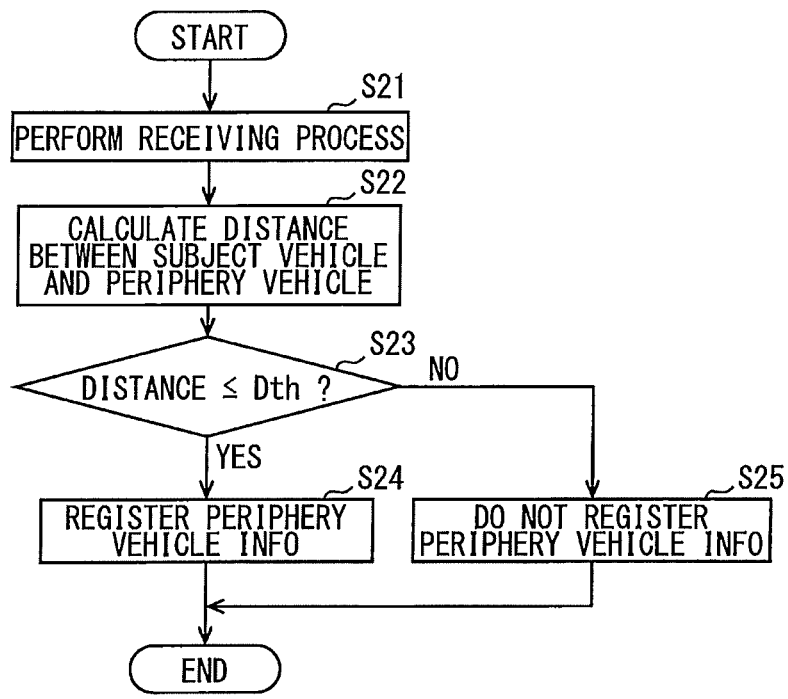
FIG. 10 is a flowchart showing an example of a receiving related process executed by the controller of the on-board device.
FIG. 11 is a diagram showing an example of information registered in a periphery vehicle database.

At S24, the registering management section 279 correlates the vehicle information received by the receiving circuit 25 to an identification information (ID) that indicates the transmission source vehicle, and registers the vehicle information in the periphery vehicle database 26 in relation to the transmission source vehicle. As shown in FIG. 11, in an example of the present embodiment, the registering management section 279 registers the vehicle information in relation to the ID of the transmission source vehicle. Herein, the vehicle information includes the position of the transmission source vehicle which is indicated by coordinates of (X1, Y1), (X2, Y2), (X3, Y3), the travelling direction θ1, θ2, θ3 of the transmission source vehicle, the speed V1, V2, V3 of the transmission source vehicle, and the transmission interval of the on-board-device 1 of the transmission source vehicle. The registering management section 279 further specifies an estimated next receiving time XXX, YYY, ZZZ of the vehicle information from the transmission source vehicle, and registers the estimated next receiving time of the vehicle information in relation to the ID of the transmission source vehicle. The registering management section 279 may calculate the estimated next receiving time of the vehicle information of the transmission source vehicle based on the transmission interval included in the received vehicle information of the transmission source vehicle. Then, the controller 27 ends the receiving related process.

In the above-described example, the vehicle information of the transmission source vehicle includes the travelling direction and the vehicle speed of the transmission source vehicle. In a case where the vehicle information of the transmission source vehicle does not include the traveling direction nor the vehicle speed, the registering management section 279 may specify the travelling direction and the vehicle speed of the transmission source vehicle based on the vehicle positions included in the vehicle information of the transmission source vehicle in a similar method described above. Then, the registering management section 279 registers the vehicle speed and the travelling direction in the periphery vehicle database 26.

At S25, the registering management section 279 does not register the vehicle information of the transmission source vehicle received by the receiving circuit 25 in the periphery vehicle database 26. That is, the registering management section 279 abandons the received vehicle information and ends the receiving related process.

The following will describe an update process of the periphery vehicle database 26. Hereinafter, the update process of the periphery vehicle database 26 is also referred to as a database update process. The database update process executed by the controller 27 of the second on-board device 1a of the second vehicle A will be described with reference to FIG. 12. In the database update process, the controller 27 performs, to the periphery vehicle database 26, an update of the vehicle information, a provisional update of the vehicle information, or a deletion of the vehicle information according to whether the vehicle information from the transmission source vehicle is received at the estimated next receiving time. The process shown in the flowchart of FIG. 12 may start in response to a registration of the vehicle information of the periphery vehicle to the periphery vehicle database 26.

At S41, the registering management section 279 determines whether the current time is an update confirmation timing based on the estimated next receiving time of the vehicle information registered in the periphery vehicle database 26. For example, when the current time is equal to the estimated next receiving time of the vehicle information registered in the periphery vehicle database 26, the registering management section 279 determines that the current time is the update confirmation timing. When the current time is not equal to the estimated next receiving time of the vehicle information registered in the periphery vehicle database 26, the registering management section 279 determines that the current time is not the update confirmation timing. The registering management section 279 may include a timer circuit (not shown) to count an elapse of time.

When the registering management section 279 determines that the current time is the update confirmation timing (S41: YES), the registering management section 279 proceeds to S42. When the registering management section 279 determines that the current time is not the update confirmation timing (S41: NO), the registering management section 279 proceeds to S51 and executes a distant information deletion process.

At S42, the communication interruption determination section 280 determines whether the vehicle information of the same transmission source vehicle is received at the estimated next receiving time. Herein, the estimated next receiving time is calculated by the registering management section 279 and is registered in the periphery vehicle database 26 correlated with the ID of the transmission source vehicle as shown in FIG. 11. When the communication interruption determination section 280 determines that the vehicle information of the same transmission source vehicle is received at the estimated next receiving time (S42: YES), the communication interruption determination section 280 determines there is no occurrence of the communication interruption and proceeds to S43. When the communication interruption determination section 280 determines that the vehicle information of the same transmission source vehicle is not received at the estimated next receiving time (S42: NO), the communication interruption determination section 280 determines an occurrence of the communication interruption and proceeds to S45.

At S43, the registering management section 279 calculates an estimated further next receiving time of the vehicle information from the same transmission source vehicle based on the transmission interval included in the vehicle information, and proceeds to S44. At S44, the registering management section 279 updates the registered vehicle information of the transmission source vehicle to the newly received vehicle information of the same transmission source vehicle. Further, the estimated next receiving time has been registered in the periphery vehicle database is updated by the estimated further next receiving time calculated at S43. Then, the controller 27 proceeds to S50.

As described above, when the communication interruption determination section 280 determines that the vehicle information of the same transmission source vehicle is not received at the estimated next receiving time (S42: NO), the communication interruption determination section 280 determines the occurrence of the communication interruption and proceeds to S45. At S45, the communication interruption determination section 280 determines whether the vehicle information of the same transmission source vehicle has been received at the immediately previous receiving time. When the communication interruption determination section 280 determines that the vehicle information of the same transmission source vehicle has not been received at the immediately previous receiving time (S45: NO), the communication interruption determination section 280 proceeds to S49. Herein, a duration between two consecutive failures of receiving of the vehicle information from the same transmission source vehicle is also referred to as a predetermined duration. In the flowchart shown in FIG. 12, the predetermined duration is an elapsed time between two consecutive determinations of NO at S42.

When the communication interruption determination section 280 determines that the vehicle information of the same transmission source vehicle has not been received at the immediately previous receiving time (S45: NO), the communication interruption determination section 280 determines an occurrence of the communication interruption between the subject vehicle and the transmission source vehicle and proceeds to S49. When the communication interruption determination section 280 determines that the vehicle information of the same transmission source vehicle has been received at the immediately previous receiving time (S45: YES), the communication interruption determination section 280 determines an occurrence of a temporary communication interruption between the subject vehicle and the transmission source vehicle. Herein, the temporary communication interruption may be caused by an obstruction positioned in a communication pathway or a temporary fading of a communication signal.

At S46, the position estimation section 281 estimates a current position of the same transmission source vehicle based on the vehicle information received at the immediately previous receiving time. For one example, the position estimation section 281 may estimate the current position of the same transmission source vehicle based on a duration time from the immediately previous receiving time of the vehicle information of the transmission source vehicle to the current time. Specifically, when estimating the current position of the same transmission source vehicle, the vehicle speed and the travelling direction of the transmission source vehicle are assumed to be constant. Then, the position estimation section 281 proceeds to S47. The position estimation section 281 functions as an estimation section.

At S47, the registering management section 279 calculates a new estimated next receiving time of the vehicle information from the same transmission source vehicle based on the transmission interval included in the vehicle information received at the immediately previous receiving time and the old estimated next receiving time registered in the periphery vehicle database 26. Specifically, the new estimated next receiving time is obtained by adding the transmission interval included in the vehicle information received at the immediately previous receiving time to the old estimated next receiving time registered in the periphery vehicle database 26. Then, the registering management section 279 proceeds to S48.

At S48, the registering management section 279 performs the provisional update of the vehicle information corresponding to the same transmission source vehicle and registered in the periphery vehicle database 26. In the provisional update, the registering management section 279 updates the registered old vehicle position to an estimated vehicle position obtained at S46, and updates the registered old estimated next receiving time to the new estimated next receiving time calculated at S47. For example, in the provisionally updated vehicle information, the vehicle speed, the travelling direction, and the transmission interval may maintain the same with the travelling direction, and the transmission interval included in the vehicle information received at the immediately previous receiving time. Then, the registering management section 279 proceeds to S50.

As described above, when the communication interruption determination section 280 determines that the vehicle information of the same transmission source vehicle has not been received at the immediately previous receiving time (S45: NO), the communication interruption determination section 280 determines an occurrence of the communication interruption between the subject vehicle and the transmission source vehicle and proceeds to S49. At S49, the communication interruption determination section 280 determines that the transmission source vehicle has moved out of the communication range of the vehicle-to-vehicle communication of the subject vehicle, and deletes the vehicle information of the transmission source vehicle from the periphery vehicle database 26. Then, the communication interruption determination section 280 proceeds to S50.

At S50, the controller 27 determines whether to end the transmission related process. Specifically, the controller 27 determines whether the current time is an end timing of the database update process. When the controller 27 determines that the current time is the end timing of the transmission related process (S50: YES), the controller 27 ends the database update process. When the controller 27 determines that the current time is not the end timing of the database update process (S50: NO), the controller 27 returns to S41 and repeatedly execute the process as described above. As an example, a time at which the second on-board device 1a is powered off may be set as the end timing of the database update process. In this case, the controller 27 determines whether the second on-board device 1a is power off at S50.

Figure 13:
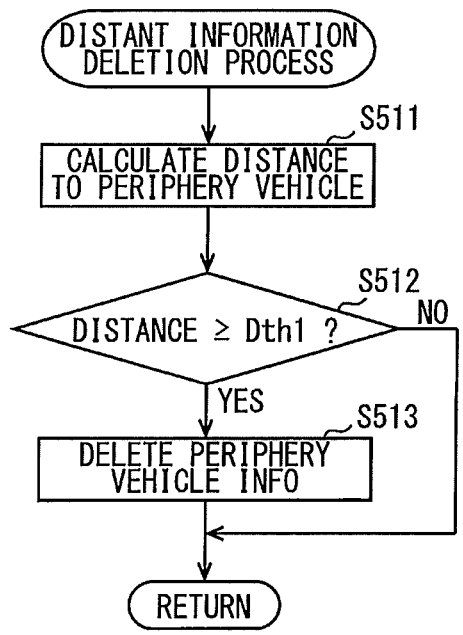
FIG. 13 is a flowchart showing an example of a distant information deletion process.

As described above, at S51, the distant information deletion process is executed. The following will describe the distant information deletion process with reference to a flowchart shown in FIG. 13. The distant information deletion process is executed in order to delete, from the periphery vehicle database 26, the registered vehicle information of the periphery vehicle from which the next vehicle information may not be received.

At S511, the distance calculation section 278 calculates a distance between the periphery vehicle and the subject vehicle when the estimated next receiving time of the vehicle information from the periphery vehicle has not come (S41: NO). The vehicle position of the transmission source vehicle included in the vehicle information received at the immediately previous receiving time may be used for the distance calculation at S511.

At S512, when the distance calculation section 278 determines that the distance calculated at S511 is equal to or longer than a predetermined distance (Dth1) (S512: YES), the distance calculation section 278 proceeds to S513. At S512, when the distance calculation section 278 determines that the distance calculated at S511 is shorter than the predetermined distance (S512: NO), the distance calculation section 278 returns to S41 of flowchart shown in FIG. 12 and repeatedly execute the process of S41.

At S513, the vehicle information of the periphery vehicle is deleted from the periphery vehicle database 26. Herein, the periphery vehicle is the vehicle whose vehicle position is away from the subject vehicle by a distance that is longer or equal to the predetermined distance (Dth1). Then, the process returns to S41 of the flowchart shown in FIG. 12 and the process of S41 is repeatedly executed.

Figure 12:
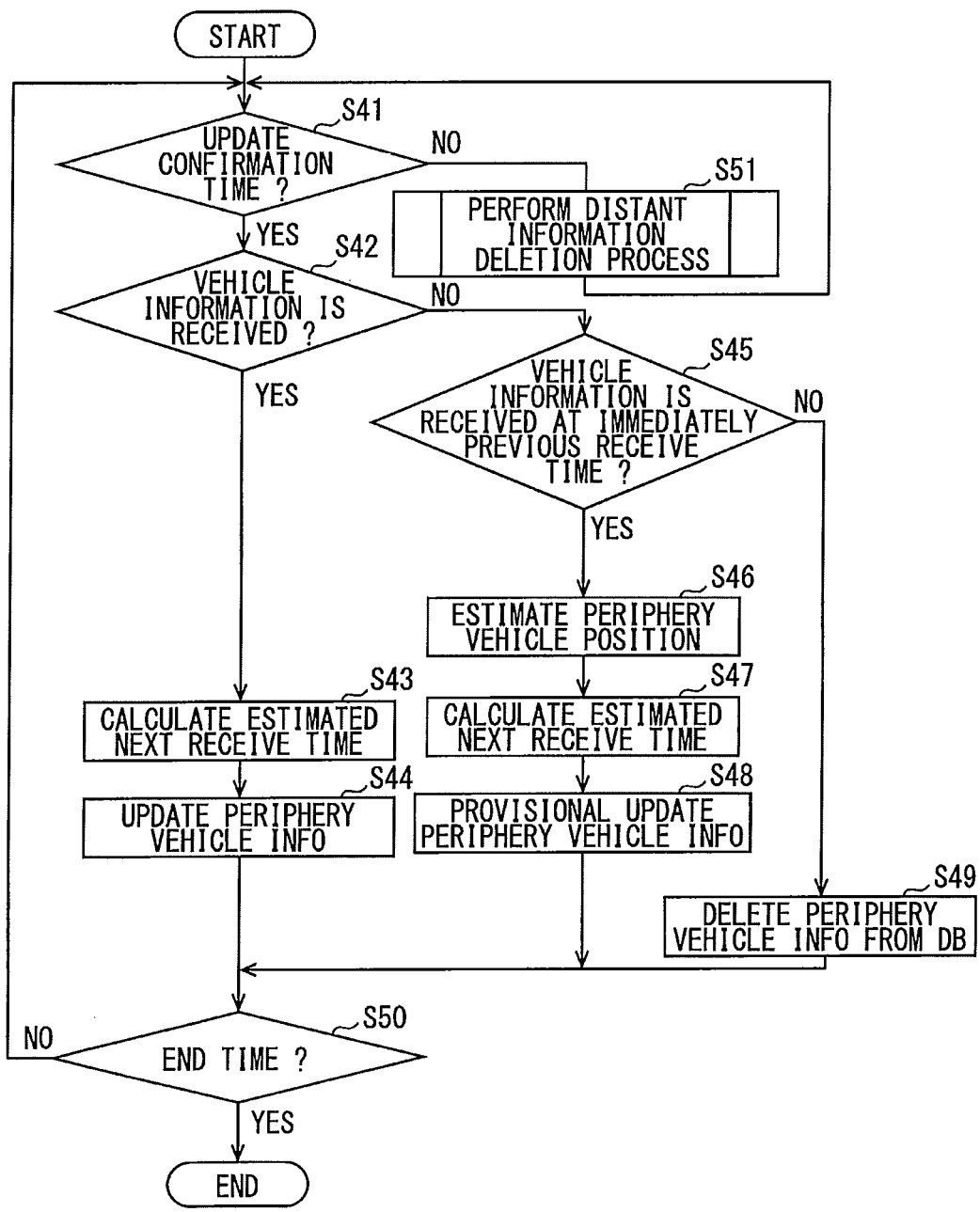
FIG. 12 is a flowchart showing an example of an update related process executed by the controller of the on-board device.

In the flowchart shown in FIG. 12, until the receiving of the vehicle information of the transmission source vehicle at the estimated next receiving time fails by twice, the controller 27 performs the provisional update of the vehicle information of the transmission source vehicle using the estimated vehicle position of the transmission source vehicle. That is, even when the receiving of the vehicle information at the estimated next receiving time fails by once, the controller 27 performs the provisional update of the vehicle information using the estimated vehicle position. With this configuration, when the temporary communication interruption between the subject vehicle and the transmission source vehicle is caused by the obstruction in the communication pathway or the temporary fading of the communication signal, the vehicle information is maintained in the periphery vehicle database 26 without deletion. Further, the provisional update of the vehicle information of the transmission source vehicle is performed using the estimated vehicle position of the transmission source vehicle. Thus, even during the temporary communication interruption, an approximate current position of the transmission source vehicle to which the second on-board device 1a is equipped can be obtained.

In the flowchart shown in FIG. 12, when the receiving of the vehicle information at the estimated next receiving time fails by twice, the controller 27 deletes the vehicle information of the transmission source vehicle. As another example, the controller 27 may be configured to delete the vehicle information of the transmission source vehicle when the receiving of the vehicle information at the estimated next receiving time fails by three or more times.

Figure 14:
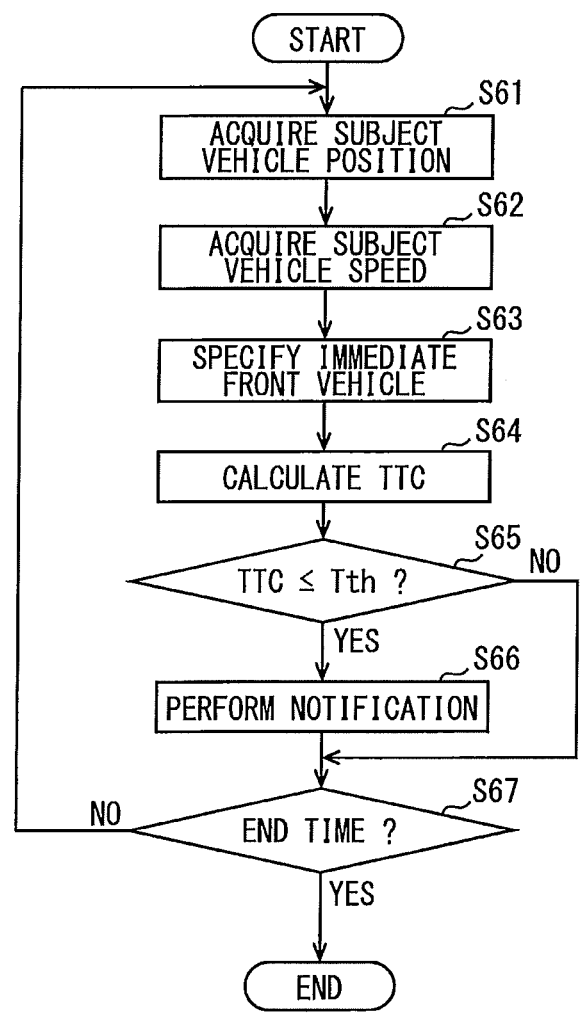
FIG. 14 is a flowchart showing an example of a drive assist related process executed by the controller of the on-board device.

The following will describe a process related to drive assist. Specifically, the following will describe a process related to drive assist executed by the controller 27 of the second on-board device 1a included in the second vehicle A with reference to the flowchart shown in FIG. 14. Hereinafter, the process related to drive assist is also referred to as drive assist related process. In the following description, suppose that an approaching of the periphery vehicle to the subject vehicle is notified to the driver of the subject vehicle as the drive assist service. That is, the present embodiment will describe an exemplary case in which an approaching of the periphery vehicle to the subject vehicle is notified to the driver of the subject vehicle as the drive assist service. The process shown in FIG. 14 may be executed in response to a registration of the vehicle information in the periphery vehicle database 26.

At S61, the vehicle position acquirement section 271 acquires the latest position of the subject vehicle. Herein, the latest position of the subject vehicle is detected by the position detector 21. At S62, the speed specifying section 272 specifies the speed of the subject vehicle.

At S63, the assist processing section 282, based on the vehicle information registered in the periphery vehicle database 26, specifies an immediately front vehicle with respect to the subject vehicle from the periphery vehicles whose vehicle informations are registered in the periphery vehicle database 26. Herein, the immediately front vehicle is a vehicle positioned or travelling closest in front of the subject vehicle.

The following will describe an example of specifying the immediately front vehicle. Suppose that two-dimensional coordinate system is set with the position of the subject vehicle as an origin, with a travelling direction of the subject vehicle as a positive direction of y axis, and with a direction perpendicular to the y axis as an x axis. When one periphery vehicle has a positive coordinate on the y axis of the two-dimensional coordinate system, the periphery vehicle is determined to be positioned in front of the subject vehicle. The travelling direction of the subject vehicle may be obtained by above-described method. Then, the distance calculation section 278 calculates a distance between the subject vehicle and the periphery vehicle specified to be positioned in front of the subject vehicle. Then, the periphery vehicle having the closest distance to the subject vehicle is specified as the immediately front vehicle.

At S64, the assist processing section 282 calculates a time to collision (TIC) between the subject vehicle and the immediately front vehicle specified at S63. Herein the time to collision may be calculated, with a well-known method, based on the latest vehicle position of the subject vehicle obtained at S61, the speed of the subject vehicle obtained at S62, the travelling direction of the subject vehicle S63 specified at S63, the vehicle position of the immediately front vehicle, the vehicle speed of the immediately front vehicle, and the travelling direction of the immediately front vehicle.

At S65, the assist processing section 282 determines whether the time to collision is equal to or shorter than a predetermined threshold time (Tth). The threshold time is settable according to actual needs. When the assist processing section 282 determines that the time to collision is equal to or shorter than the predetermined threshold time (S65: YES), the process proceeds to S66. When the assist processing section 282 determines that the time to collision is longer than the predetermined threshold time (S65: YES), the process proceeds to S67.

At S66, the assist processing section 282 performs a notification, with the display device 2 or the audio output device 3, for notifying of the approach of the subject vehicle to the immediately front vehicle to the driver of the subject vehicle. Then, the process proceeds to S67.

At S67, the controller 27 determines whether the current time is the end timing of the drive assist related process. When the controller 27 determines that the current time is the end timing of the drive assist related process (S67: YES), the controller 27 ends the drive assist related process. When the controller 27 determines that the current time is not the end timing of the drive assist related process (S67: NO), the controller 27 returns to S61 and repeatedly execute above-described process. For example, the end timing may be set as a time at which the second on-board device 1a is powered off. In this case, the controller 27 determines whether the second on-board device 1a is powered off at S67.

In the present embodiment, the second on-board device 1a determines the occurrence of the communication interruption between the subject vehicle and the transmission source vehicle based on whether the vehicle information of the transmission source vehicle is received at the estimated next receiving time. Herein, the estimated next receiving time is calculated based on the transmission interval included in the latest vehicle information of the transmission source vehicle, and the vehicle information of the transmission source vehicle is transmitted to the subject vehicle via the vehicle-to-vehicle communication. Thus, when the transmission interval of the vehicle information transmitted via the vehicle-to-vehicle communication is changed in one vehicle, the change of the transmission interval can be notified to the communication partner vehicle. In this way, the second on-board device 1a of the subject vehicle can determine the communication interruption between the periphery vehicle B2 and the subject vehicle A caused by the obstruction C, or the communication interruption between the periphery vehicle B3 and the subject vehicle A caused by the exiting from the communication range.

Thus, the second on-board device 1a can easily determine the communication interruption in the vehicle-to-vehicle communication even when the first on-board device 1b changes the transmission interval of the vehicle information. That is, the vehicle A that receives the vehicle information from periphery vehicles B is able to determine the communication interruption in the vehicle-to-vehicle communication easily with an improved reliability even when the periphery vehicle B that transmits the vehicle information changes the transmission interval of the vehicle information.

Second Embodiment

The following will describe a second embodiment of the present disclosure with reference to the drawings. In the following description, configurations or functions similar to the above-described embodiments or modifications are omitted for simplification, and the same reference symbol is used for the same or equivalent part.

Figure 15:
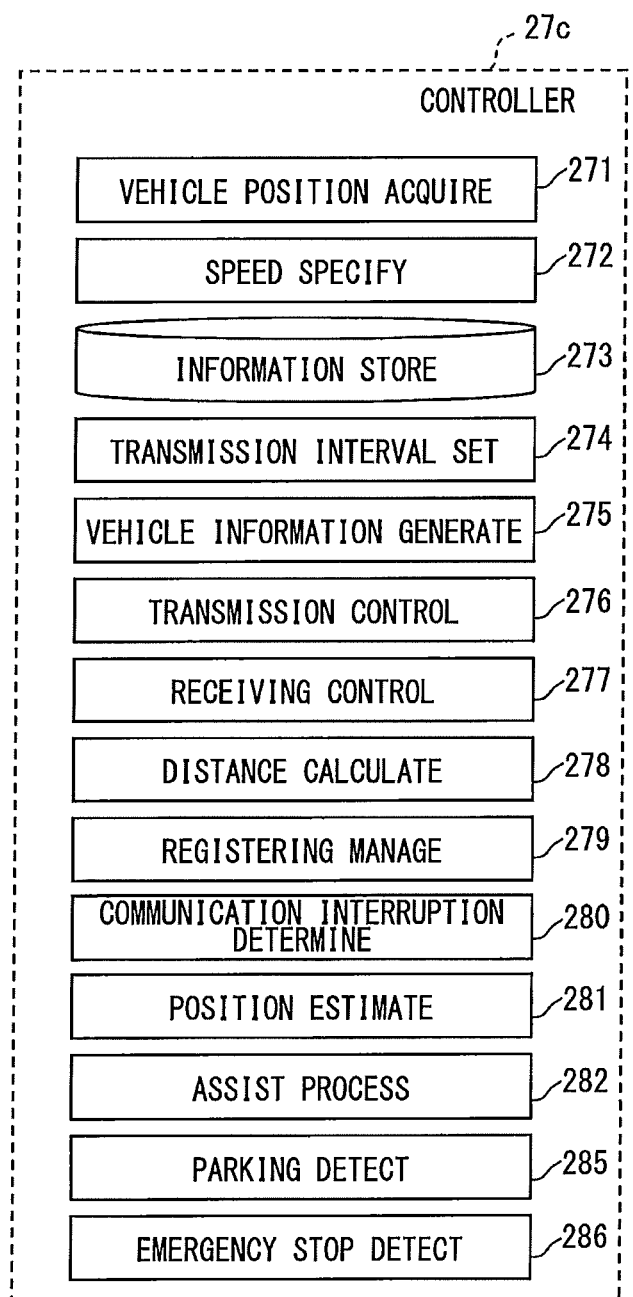
FIG. 15 is a block diagram showing an example of a configuration of a controller according to a second embodiment of the present disclosure.

In the present embodiment, the first on-board device 1b includes a controller 27c shown in FIG. 15. The controller 27c is different from the controller 27 described in the first embodiment. Specifically, the transmission related process executed by the controller 27c of the present embodiment is different from the first embodiment. Other configurations and operations of the present embodiment are similar to the first embodiment.

As shown in FIG. 15, the controller 27c according to the present embodiment further includes a parking detection section 285 and an emergency stop detection section 286. The parking detection section 285 detects a parking state of the subject vehicle. In the present embodiment, the parking state of the subject vehicle indicates a state of the vehicle after an act of stopping and disengaging the vehicle and the vehicle is parked in a parking lot. The emergency stop detection section 286 detects an emergency stop state of the subject vehicle. When the parking detection section 285 detects the parking state of the subject vehicle or the emergency stop detection section 286 detects an emergency stop state of the subject vehicle, the controller 27c changes the transmission interval of the vehicle information to an infinitely large value.

The following will describe a configuration of the controller 27c in detail with reference to FIG. 15. As shown in FIG. 15, the controller 27c includes the vehicle position acquirement section 271, the speed specifying section 272, the information storing section 273, the transmission interval setting section 274, the vehicle information generation section 275, the transmission control section 276, the receiving control section 277, the distance calculation section 278, the registering management section 279, the communication interruption determination section 280, the position estimation section 281, the assist processing section 282, the parking detection section (PARKING DETECT) 285, and the emergency stop detection section (EMERGENCY STOP DETECT) 286.

For example, parking detection section 285 may determine that the subject vehicle is in the parking state when an ignition switch of the subject vehicle is in an OFF state. The emergency stop detection 286 detects the emergency stop state of the subject vehicle. Herein, the emergency stop state of the subject vehicle is a state in which the subject vehicle is stopped caused by an emergency. For example, when an emergency report system equipped to the subject vehicle reports an emergency or an antilock brake system (ABS) is activated, the emergency stop detection 286 may detect an occurrence of the emergency stop state of the subject vehicle. The parking detection section 285 and the emergency stop detection section 286 of the present embodiment function as a second parking detection section.

Figure 16:
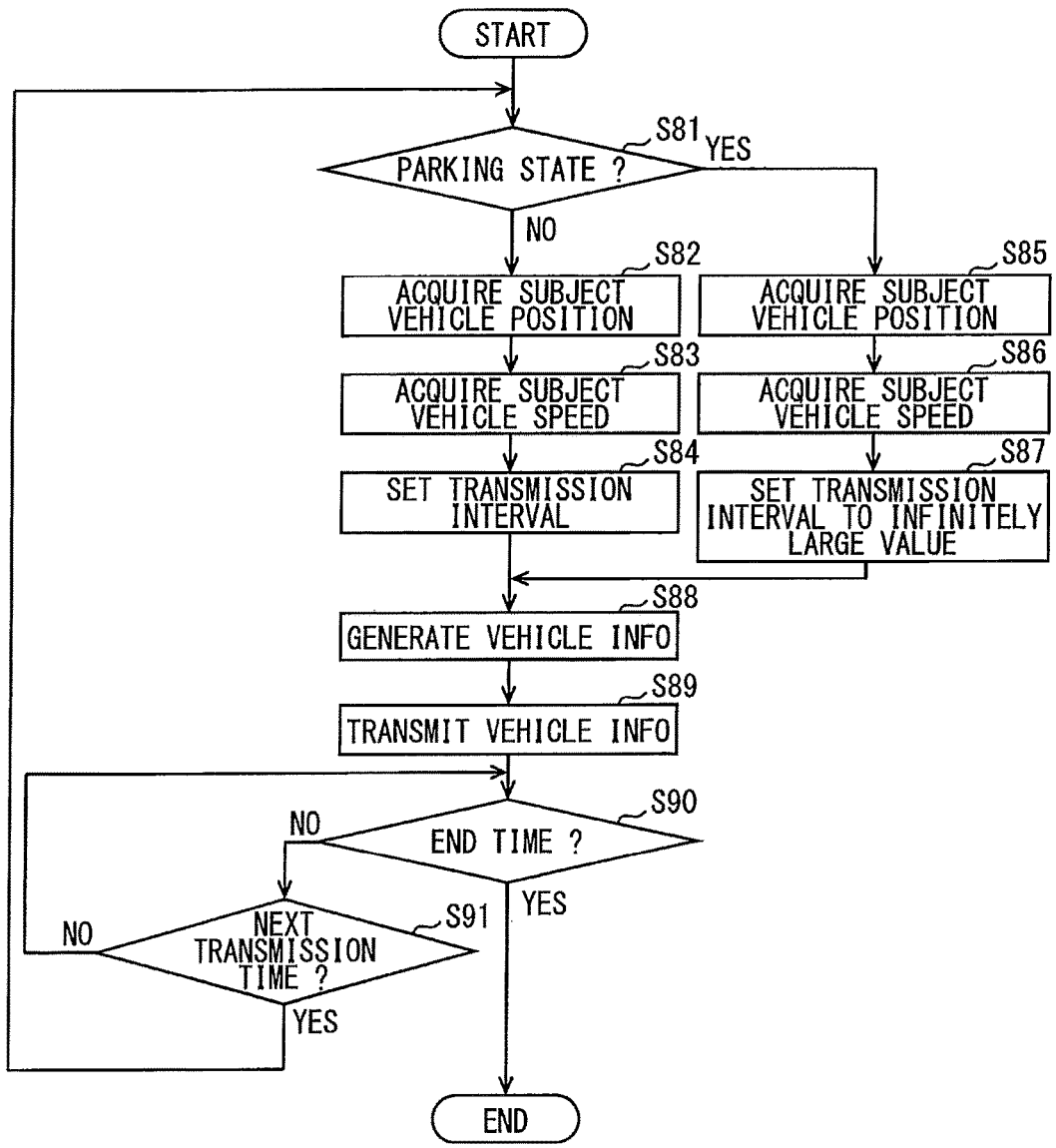
FIG. 16 is a flowchart showing an example of a transmission related process according to the second embodiment.

The following will describe the transmission related process executed by the controller 27c of the first on-board device 1b equipped to the first vehicle B1, B2, B3 with reference to the flowchart shown in FIG. 16. In the present embodiment, subject vehicle is used to describe the vehicle to which the first on-board device 1b is equipped. The controller 27c may start the process shown in the flowchart of FIG. 16 in response to a receiving of the vehicle information by the receiving circuit 25 of the on-board device 1b.

At S81, when the parking detection section 285 determines a parking state of the subject vehicle or the emergency stop detection section 286 determines an emergency stop state of the subject vehicle (S81: YES), the process proceeds to S85. When the parking detection section 285 fails to determine a parking state of the subject vehicle or the emergency stop detection section 286 fails to determine an emergency stop state of the subject vehicle (S81: NO), that is while the subject vehicle is travelling, the process proceeds to S82.

The process executed at S82, S83, S84 are similar to the process executed at S1, S2, S3 of the first embodiment shown in FIG. 4, respectively. Herein, S82, S83, S84 are executed in response to a non-detection of the parking state of the subject vehicle or a non-detection of the emergency stop state of the subject vehicle. The determination of transmission interval at S84 may have a configuration described in the first modification or the second modification. Further, the determination of transmission interval at S84 may have a combined configuration of the present embodiment, the first modification or the second modification.

The process executed at S85, S86 are similar to the process executed at S1 and S2 of the first embodiment shown in FIG. 4, respectively. In the present embodiment, S85, S86, S87 are executed in response to a detection of the parking state of the subject vehicle or a detection of the emergency stop state of the subject vehicle. At S87, the transmission interval setting section 274 sets the transmission interval between the current transmission of the vehicle information and the next transmission of the vehicle information to an infinitely large value. Herein, the setting of the transmission interval to the infinitely large value means a cancellation of next transmission of the vehicle information.

The process executed at S88, S89, S90, S91 are similar to the process executed at S4, S5, S6, S7 of the first embodiment shown in FIG. 4, respectively.

When the subject vehicle is in a parking state or is stopped caused by an emergency situation, the vehicle speed or the travelling direction of the subject vehicle are supposed to be maintained the same for a quite long period. While the vehicle speed or the travelling direction of the subject vehicle does not change for the quite long period, the transmission of the vehicle information by the on-board device 1 may cause unnecessary power consumption. In a case where the parking or the emergency stop of the subject vehicle occurs, it is considered that the position at which the subject vehicle is parked or is emergently stopped need to be notified to other vehicles. Thus, the transmission of the vehicle information is performed by only once. In the present embodiment, the parking position or the emergency stop position of the subject vehicle is notified to the periphery vehicles by once. Then, the transmission of the vehicle information is canceled. Thus, the periphery vehicles are notified of the position of the subject vehicle via the vehicle-to-vehicle communication and the power consumption of the first on-board device 1b of the subject vehicle can be reduced.

Third Embodiment

The following will describe a third embodiment of the present disclosure with reference to the drawings. In the following description, configurations or functions similar to the above-described embodiments or modifications are omitted for simplification, and the same reference symbol is used for the same or equivalent part.

Figure 17:
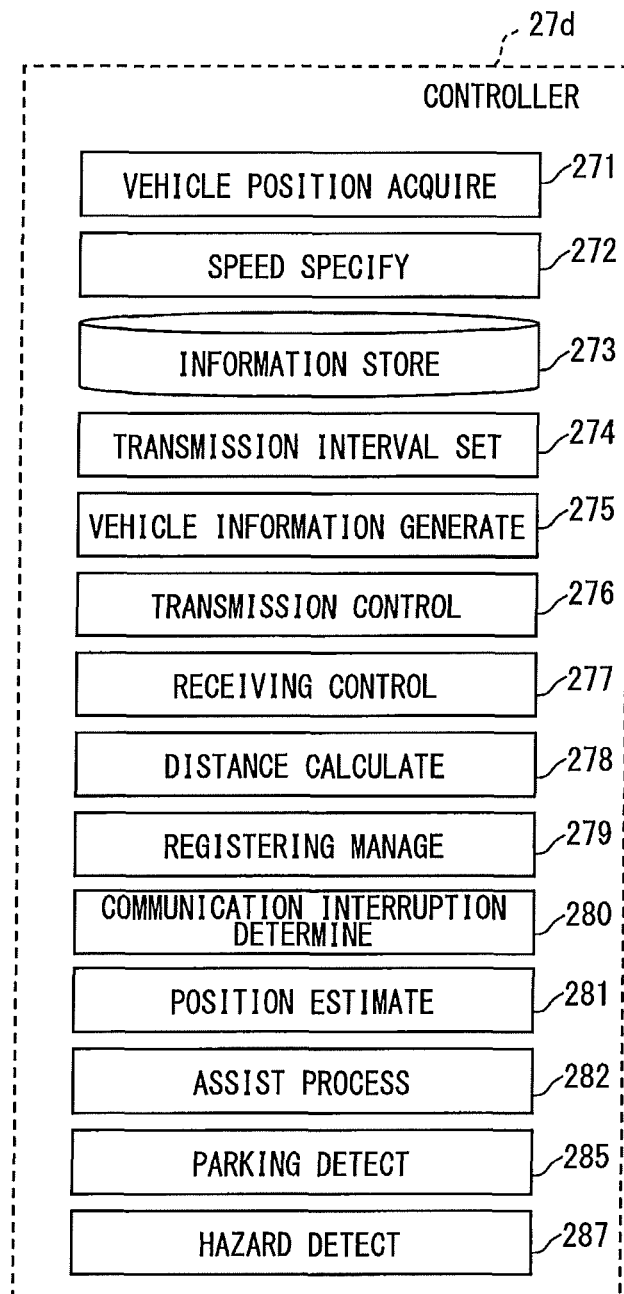
FIG. 17 is a block diagram showing an example of a configuration of a controller according to a third embodiment of the present disclosure.

In the present embodiment, the first on-board device 1b includes a controller 27d shown in FIG. 17. The controller 27d is different from the controller 27 described in the first embodiment. Specifically, the transmission related process executed by the controller 27d of the present embodiment is different from the first embodiment. Other configurations and operations of the present embodiment are similar to the first embodiment. As shown in FIG. 16, the controller 27d according to the present embodiment further includes the parking detection section 285 described in the second embodiment and an hazard detection section 287. The parking detection section 285 detects a parking state of the subject vehicle. The hazard detection section 287 detects an ON or OFF state of a hazard lamp of the subject vehicle. When the parking detection section 285 detects a parking state of the subject vehicle, the controller 27d changes the transmission interval of the vehicle information according to the ON or OFF state of the hazard lamp.

The following will describe a configuration of the controller 27d in detail with reference to FIG. 17. As shown in FIG. 17, the controller 27d includes the vehicle position acquirement section 271, the speed specifying section 272, the information storing section 273, the transmission interval setting section 274, the vehicle information generation section 275, the transmission control section 276, the receiving control section 277, the distance calculation section 278, the registering management section 279, the communication interruption determination section 280, the position estimation section 281, the assist processing section 282, the parking detection section 285, and the hazard detection section 287.

The parking detection section 285 detects a parking state of the subject vehicle. In the present embodiment, subject vehicle is used to describe the vehicle to which the first on-board device 1b is equipped. The hazard detection section 287 detects an ON or OFF state of the hazard lamp of the subject vehicle based on a hazard lamp switch signal. The parking detection section 285 in the present embodiment functions as a first parking detection section.

Figure 18:
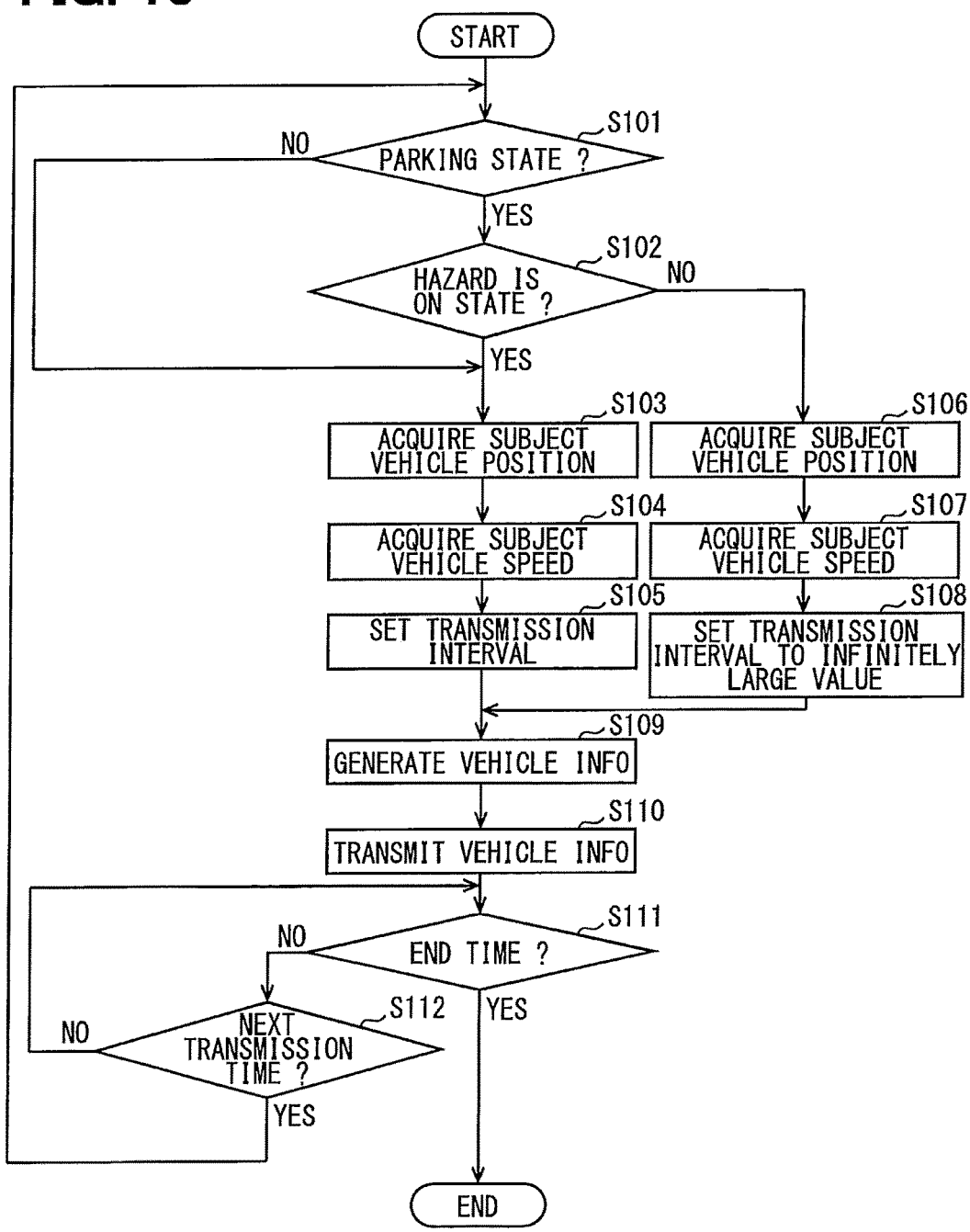
FIG. 18 is a flowchart showing an example of a transmission related process according to the third embodiment.

The following will describe the transmission related process executed by the controller 27d of the first on-board device 1b equipped to the first vehicle B1, B2, B3 with reference to the flowchart shown in FIG. 18. The controller 27d may start the process shown in the flowchart of FIG. 18 in response to a receiving of the vehicle information by the receiving circuit 25 of the first on-board device 1b.

At S101, when the parking detection section 285 detects a parking state of the subject vehicle (S101: YES), the process proceeds to S102. When the parking detection section 285 detects a non-parking state of the subject vehicle (S101: NO), such as during a traveling, the process proceeds to S103.

At S102, when the hazard detection section detects an ON state of the hazard lamp (S102: YES), the process proceeds to S103. When the hazard detection section detects an OFF state of the hazard lamp (S102: NO), the process proceeds to S106.

The process executed at S103, S104, S105 are similar to the process executed at S1, S2, S3 of the first embodiment shown in FIG. 4, respectively. Herein, S103, S104, S105 are executed in response to (i) a detection of the ON state of the hazard lamp during a parking state of the vehicle or (ii) a detection of a non-parking state of the subject vehicle. The determination of transmission interval at S105 may have a configuration described in the first modification or the second modification. Further, the determination of transmission interval at S105 may have a combined configuration of the present embodiment, the first modification or the second modification.

The process executed at S106, S107 are similar to the process executed at S1 and S2 of the first embodiment shown in FIG. 4, respectively. In the present embodiment, S106, S107, S108 are executed in response to a detection of the parking state of the subject vehicle and a detection of the OFF state of the hazard lamp of the subject vehicle. At S108, the transmission interval setting section 274 sets the transmission interval between the current transmission of the vehicle information and the next transmission of the vehicle information to an infinitely large value. Herein, the setting of the transmission interval to the infinitely large value means a cancellation of next transmission of the vehicle information.

The process executed at S109, S110, S111, S112 are similar to the process executed at S4, S5, S6, S7 of the first embodiment shown in FIG. 4, respectively.

When the subject vehicle is in a parking state, the vehicle speed or the travelling direction of the subject vehicle is supposed to be maintained the same for a quite long period. While the vehicle speed or the travelling direction of the subject vehicle does not change for the quite long period, the transmission of the vehicle information by the on-board device 1 may cause unnecessary power consumption. When the subject vehicle is in a parking state, one time transmission of the position of the subject vehicle to the periphery vehicles is enough for the periphery vehicles.

When the hazard lamp of the subject vehicle is in the ON state during the parking state of the subject vehicle, the subject vehicle is less likely to park for a long time compared with a case in which the hazard lamp of the subject vehicle is in the OFF state during the parking state of the subject vehicle. In the present embodiment, when the subject vehicle is in the parking state and the hazard lamp of the subject vehicle is in the OFF state, the parking position of the subject vehicle is notified to the periphery vehicles by once, and then, the transmission of the vehicle information is cancelled.

In the present embodiment, when the parking detection section 285 detects the parking state of the subject vehicle and the hazard detection section 287 detects the OFF state of the hazard lamp, the transmission interval of the vehicle information is set to the infinitely large value. For another example, the controller 27d may further include the emergency stop detection section 286 described in the foregoing embodiment instead of the parking detection section 285. In this case, the transmission interval of the vehicle information may be set to the infinitely large value when the emergency stop detection section 286 detects the emergency stop state of the subject vehicle and the hazard detection section 287 detects the OFF state of the hazard lamp.

Third Modification

In the foregoing embodiments, the vehicle information transmitted from the first on-board device 1b includes the transmission interval determined by the transmission interval setting section 274. For another example, both the first on-board device 1b and the second on-board device 1a may store the common speed-transmission interval table. In this example, since the second on-board device 1a has the speed-transmission interval table, the second on-board device 1a is able to specify the transmission interval of the vehicle information transmitted from the first vehicle based on the speed of the first vehicle. Thus, when the first on-board device 1b includes at least the vehicle speed in the vehicle information without the transmission interval, the transmission interval of the first on-board device 1b can be specified at the second on-board device 1a based on the stored speed-transmission interval table. In this case, the vehicle speed for specifying the transmission interval is also referred to as transmission interval related information. Herein, the transmission interval related information is information based on which the transmission interval can be specified.

Fourth Modification

In the foregoing embodiments, the on-board device 1, the display device 2, and the audio output device 3 are separated from one another. For another example, the on-board device 1, the display device 2, and the audio output device 3 may be configured as one device.

Fifth Modification

In the foregoing embodiments, the on-board device 1 executes the drive assist related process. As another example, a control device separated and different from the on-board device 1, such as a different electronic control unit, can execute the drive assist related process. As another example, the periphery vehicle database 26 can be included in a device that is separated and different from the on-board device 1.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. An on-board wireless device, which is used in a subject vehicle and transmits a vehicle information of the subject vehicle to a periphery vehicle positioned around the subject vehicle, the on-board wireless device comprising:
    a transmitting circuit successively transmitting the vehicle information of the subject vehicle via a vehicle-to-vehicle communication at a transmission interval;
    a transmission interval setting section setting the transmission interval that is variable for transmitting the vehicle information;
    a generation section generating the vehicle information to be transmitted by the transmitting circuit, the generation section including a transmission interval related information in the vehicle information, the transmission interval related information being an information based on which the transmission interval set by the transmission interval setting section can be specified, the transmitting circuit transmitting the vehicle information of the subject vehicle, which includes the transmission interval related information, to the periphery vehicle;
    a parking detection section detecting a parking state of the subject vehicle; and
    a hazard detection section detecting an on state or an off state of a hazard lamp of the subject vehicle, wherein
    when the parking detection section detects the parking state of the subject vehicle and the hazard detection section detects the on state of the hazard lamp, the transmission interval setting section sets the transmission interval to have a first value,
    when the parking detection section detects the parking state of the subject vehicle and the hazard detection section detects the off state of the hazard lamp, the transmission interval setting section sets the transmission interval to have a second value, and
    the second value is greater than the first value.

2. The on-board wireless device according to claim 1, further comprising
    a congestion degree specifying section successively specifying a congestion degree of the vehicle-to-vehicle communication,
    wherein the transmission interval setting section sets the transmission interval corresponding to the congestion degree of the vehicle-to-vehicle communication.

3. The on-board wireless device according to claim 1, further comprising
    a distance specifying section successively specifying a distance between the subject vehicle and the periphery vehicle, the periphery vehicle being a closest vehicle to the subject vehicle,
    wherein the transmission interval setting section sets the transmission interval corresponding to the distance between subject vehicle and the closest periphery vehicle.

4. The on-board wireless device according to claim 1, further comprising
    a vehicle speed specifying section successively specifying a speed of the subject vehicle,
    wherein the transmission interval setting section sets the transmission interval corresponding to the speed of the subject vehicle.

5. An on-board wireless device, which is used in a subject vehicle and receives, from a periphery vehicle positioned around the subject vehicle, a vehicle information of the periphery vehicle, the on-board wireless device comprising:
    a receiving circuit successively receiving the vehicle information of the periphery vehicle from the periphery vehicle via a vehicle-to-vehicle communication, the vehicle information of the periphery vehicle including a transmission interval related information based on which a transmission interval for transmitting the vehicle information at the periphery vehicle can be specified; and
    a communication interruption determination section determining an occurrence of a communication interruption in the vehicle-to-vehicle communication between the subject vehicle and the periphery vehicle based on the transmission interval specified from the transmission interval related information; wherein
    when an actually detected transmission interval between the subject vehicle and the periphery vehicle is longer than the transmission interval specified from the transmission interval related information, the communication interruption determination section determines the occurrence of the communication interruption in the vehicle-to-vehicle communication.

6. The on-board wireless device according to claim 5, further comprising
    a registering section registering the vehicle information of the periphery vehicle in correspondence with an identification information of the periphery vehicle.

7. The on-board wireless device according to claim 6, further comprising
    a registering management section, wherein
    the communication interruption determination section determines whether the communication interruption has continued for a predetermined period, the predetermined period being set based on the transmission interval specified from the transmission interval related information, and
    when the communication interruption determination section determines that the communication interruption between the subject vehicle and the periphery vehicle has continued for the predetermined period, the registering management section deletes the vehicle information of the periphery vehicle from the registering section.

8. The on-board wireless device according to claim 7, further comprising
an estimation section, wherein
the vehicle information of the periphery vehicle includes a vehicle position of the periphery vehicle,
the registering management section calculates an estimated receiving time of the vehicle information from the periphery vehicle based on the transmission interval, the transmission interval is specified from the transmission interval related information that is included in the vehicle information of the periphery vehicle received by the receiving circuit in the past,
the estimation section estimates a current position of the periphery vehicle based on the vehicle position of the periphery vehicle included in the vehicle information of the periphery received by the receiving circuit in the past, and
until the communication interruption determination section determines that the communication interruption has continued for the predetermined period, the registering management section updates the vehicle position of the periphery vehicle registered in the registering section with the current position that is estimated even when the receiving circuit fails to receive the vehicle information of the periphery vehicle at the estimated receiving time.

9. A communication system comprising:
a first on-board wireless device used in a first vehicle and successively transmitting a vehicle information of the first vehicle to a second vehicle positioned around the first vehicle via a vehicle-to-vehicle communication, the first on-board wireless device including a transmitting circuit that successively transmits the vehicle information of the first vehicle at a transmission interval that is variable; and
a second on-board wireless device used in the second vehicle and successively receiving the vehicle information of the first vehicle from the first vehicle, wherein
the first on-board wireless device further includes:
a transmission interval setting section setting the transmission interval that is variable for transmitting the vehicle information of the first vehicle; and
a generation section generating the vehicle information of the first vehicle to be transmitted by the transmitting circuit, the generation section including a transmission interval related information in the vehicle information of the first vehicle, the transmission interval related information being an information based on which the transmission interval set by the transmission interval setting section can be specified, the transmitting circuit transmitting the vehicle information of the first vehicle which includes the transmission interval related information, and
the second on-board wireless device includes:
a receiving circuit successively receiving the vehicle information of the first vehicle from the first vehicle via the vehicle-to-vehicle communication, the vehicle information of the first vehicle including the transmission interval related information; and
a communication interruption determination section determining an occurrence of a communication interruption in the vehicle-to-vehicle communication between the first on-board wireless device and the second on-board wireless device based on the transmission interval specified from the transmission interval related information included in the vehicle information of the first vehicle; wherein
when an actually detected transmission interval between the first vehicle and the second vehicle is longer than the transmission interval specified from the transmission interval related information, the communication interruption determination section determines the occurrence of the communication interruption in the vehicle-to-vehicle communication.

10. An on-board wireless device, which is used in a subject vehicle and transmits a vehicle information of the subject vehicle to a periphery vehicle positioned around the subject vehicle, the on-board wireless device comprising:
a transmitting circuit successively transmitting the vehicle information of the subject vehicle via a vehicle-to-vehicle communication at a transmission interval;
a transmission interval setting section setting the transmission interval that is variable for transmitting the vehicle information;
a generation section generating the vehicle information to be transmitted by the transmitting circuit, the generation section including a transmission interval related information in the vehicle information, the transmission interval related information being an information based on which the transmission interval set by the transmission interval setting section can be specified, the transmitting circuit transmitting the vehicle information of the subject vehicle, which includes the transmission interval related information, to the periphery vehicle;
a parking detection section detecting a parking state of the subject vehicle, the parking state of the subject vehicle including an emergency stop state of the subject vehicle, wherein
when the parking detection section detects the parking state of the subject vehicle, the transmission interval setting section sets the transmission interval to have a third value,
when the parking detection section detects a non-parking state of the subject vehicle, the transmission interval setting section sets the transmission interval to have a fourth value, and
the third value is greater than the fourth value.

11. The on-board wireless device according to claim 10, further comprising
a congestion degree specifying section successively specifying a congestion degree of the vehicle-to-vehicle communication,
wherein the transmission interval setting section sets the transmission interval corresponding to the congestion degree of the vehicle-to-vehicle communication.

12. The on-board wireless device according to claim 10, further comprising
a distance specifying section successively specifying a distance between the subject vehicle and the periphery vehicle, the periphery vehicle being a closest vehicle to the subject vehicle,
wherein the transmission interval setting section sets the transmission interval corresponding to the distance between subject vehicle and the closest periphery vehicle.

13. The on-board wireless device according to claim 10, further comprising
a vehicle speed specifying section successively specifying a speed of the subject vehicle, wherein the transmission interval setting section sets the transmission interval corresponding to the speed of the subject vehicle.

* * * * *